US012132581B2

(12) United States Patent
Sen et al.

(10) Patent No.: US 12,132,581 B2
(45) Date of Patent: Oct. 29, 2024

(54) NETWORK INTERFACE CONTROLLER WITH EVICTION CACHE

(71) Applicant: Intel Corporation, Santa Clara, CA (US)

(72) Inventors: Sujoy Sen, Beaverton, OR (US); Durgesh Srivastava, Cupertino, CA (US); Thomas E. Willis, Redwood City, CA (US); Bassam N. Coury, Portland, OR (US); Marcelo Cintra, Braunschweig (DE)

(73) Assignee: Intel Corporation, Santa Clara, CA (US)

( * ) Notice: Subject to any disclaimer, the term of this patent is extended or adjusted under 35 U.S.C. 154(b) by 687 days.

(21) Appl. No.: 17/103,802

(22) Filed: Nov. 24, 2020

(65) Prior Publication Data

US 2021/0149812 A1     May 20, 2021

Related U.S. Application Data

(60) Provisional application No. 63/115,511, filed on Nov. 18, 2020.

(51) Int. Cl.
*H04L 12/18*       (2006.01)
*G06F 12/02*       (2006.01)
(Continued)

(52) U.S. Cl.
CPC ...... *H04L 12/1868* (2013.01); *G06F 12/0238* (2013.01); *G06F 12/0813* (2013.01);
(Continued)

(58) Field of Classification Search
CPC . H04L 12/1868; H04L 12/5601; H04L 45/74; H04L 49/201; H04L 67/1095;
(Continued)

(56) References Cited

U.S. PATENT DOCUMENTS 6,331,983 B1   12/2001   Haggerty et al.
6,625,121 B1    9/2003   Lau et al.
(Continued)

FOREIGN PATENT DOCUMENTS

CN     110401599 A    11/2019
WO   2015021822 A1    2/2015

OTHER PUBLICATIONS

Extended European Search Report for Patent Application No. 21196829.2, Mailed Mar. 3, 2022, 7 pages.
(Continued)

*Primary Examiner* — Jason W Blust
(74) *Attorney, Agent, or Firm* — Compass IP Law PC

(57) ABSTRACT

Examples described herein includes an apparatus comprising: a network interface configured to: receive a request to copy data from a local memory to a remote memory; based on a configuration that the network interface is to manage a cache store the data into the cache and record that the data is stored in the cache. In some examples, store the data in the cache comprises store most recently evicted data from the local memory into the cache. In some examples, the network interface is to store data evicted from the local memory that is not stored into the cache into one or more remote memories.

21 Claims, 22 Drawing Sheets

(51) Int. Cl.

| | | |
|---|---|---|
| *G06F 12/0813* | (2016.01) | |
| *G06F 12/0837* | (2016.01) | |
| *G06F 12/0862* | (2016.01) | |
| *G06F 12/0877* | (2016.01) | |
| *G06F 12/0891* | (2016.01) | |
| *G06F 12/1081* | (2016.01) | |
| *G06F 13/16* | (2006.01) | |
| *G06F 13/28* | (2006.01) | |
| *G06F 13/40* | (2006.01) | |
| *H04L 12/54* | (2022.01) | |
| *H04L 45/74* | (2022.01) | |
| *H04L 49/201* | (2022.01) | |
| *H04L 67/1095* | (2022.01) | |
| *H04L 12/70* | (2013.01) | |

(52) U.S. Cl.
CPC ...... *G06F 12/0837* (2013.01); *G06F 12/0862* (2013.01); *G06F 12/0877* (2013.01); *G06F 12/0891* (2013.01); *G06F 12/1081* (2013.01); *G06F 13/1689* (2013.01); *G06F 13/28* (2013.01); *G06F 13/4059* (2013.01); *H04L 12/5601* (2013.01); *H04L 45/74* (2013.01); *H04L 49/201* (2013.01); *H04L 67/1095* (2013.01); *G06F 2213/28* (2013.01); *H04L 2012/562* (2013.01)

(58) Field of Classification Search
CPC ........... H04L 2012/562; H04L 45/7453; H04L 45/16; H04L 45/745; H04L 47/34; G06F 12/0238; G06F 12/0813; G06F 12/0837; G06F 12/0862; G06F 12/0877; G06F 12/0891; G06F 12/1081; G06F 13/1689; G06F 13/28; G06F 13/4059; G06F 2213/28; G06F 13/1694; G06F 13/385; G06F 12/0284; G06F 2212/1024; G06F 2212/154; G06F 2212/217; G06F 2212/7201; G06F 2212/7208; G06F 13/4022; G06F 13/1684; G06F 13/4068; G06F 13/4221
See application file for complete search history.

(56) References Cited

U.S. PATENT DOCUMENTS

| | | | |
|---|---|---|---|
| 6,625,773 | B1 | 9/2003 | Boivie et al. |
| 7,075,904 | B1 | 7/2006 | Manish et al. |
| 7,987,229 | B1 | 7/2011 | Kinne et al. |
| 9,588,928 | B1 | 3/2017 | Swartzentruber |
| 9,959,227 | B1 | 5/2018 | Diamant et al. |
| 11,231,987 | B1 | 1/2022 | Bose et al. |
| 2001/0021949 | A1 | 9/2001 | Blightman et al. |
| 2002/0041594 | A1 | 4/2002 | Suzuki et al. |
| 2005/0081080 | A1 | 4/2005 | Bender et al. |
| 2005/0216642 | A1 | 9/2005 | Lee |
| 2005/0238035 | A1 | 10/2005 | Riley |
| 2006/0075057 | A1 | 4/2006 | Gildea et al. |
| 2009/0006666 | A1 | 1/2009 | Chen et al. |
| 2011/0035459 | A1 | 2/2011 | Desai et al. |
| 2011/0072234 | A1 | 3/2011 | Chinya et al. |
| 2011/0173396 | A1* | 7/2011 | Sugumar ............. G06F 12/0862 709/212 |
| 2013/0232284 | A1 | 9/2013 | Akiyama et al. |
| 2014/0092678 | A1 | 4/2014 | Feekes |
| 2015/0006663 | A1 | 1/2015 | Huang et al. |
| 2015/0092539 | A1 | 4/2015 | Sivabalan et al. |
| 2015/0134891 | A1 | 5/2015 | Jo |
| 2015/0293881 | A1* | 10/2015 | Raikin .................... H04L 67/02 709/212 |
| 2016/0077966 | A1 | 3/2016 | Stabrawa et al. |
| 2016/0267053 | A1 | 9/2016 | Sharp et al. |
| 2017/0041157 | A1 | 2/2017 | Zheng |
| 2018/0176324 | A1 | 6/2018 | Kumar et al. |
| 2018/0181330 | A1 | 6/2018 | Kusters et al. |
| 2018/0239726 | A1 | 8/2018 | Wang et al. |
| 2018/0329841 | A1 | 11/2018 | Maeda |
| 2019/0114102 | A1 | 4/2019 | Chen |
| 2019/0123922 | A1 | 4/2019 | Suthar et al. |
| 2019/0278676 | A1 | 9/2019 | Zou et al. |
| 2019/0313275 | A1 | 10/2019 | Chen et al. |
| 2019/0334836 | A1 | 10/2019 | Ajima et al. |
| 2019/0394127 | A1 | 12/2019 | Gerhart et al. |
| 2020/0004685 | A1 | 1/2020 | Bernat et al. |
| 2020/0021492 | A1 | 1/2020 | Ganguli et al. |
| 2020/0042358 | A1 | 2/2020 | Sun et al. |
| 2020/0104275 | A1 | 4/2020 | Sen et al. |
| 2020/0133909 | A1 | 4/2020 | Hefty et al. |
| 2020/0136996 | A1 | 4/2020 | Li et al. |
| 2020/0210360 | A1 | 7/2020 | Reghunath et al. |
| 2020/0296057 | A1 | 9/2020 | Mula et al. |
| 2020/0326889 | A1 | 10/2020 | Norman et al. |
| 2020/0349074 | A1* | 11/2020 | Kucherov ............. G06F 3/0619 |
| 2021/0073151 | A1 | 3/2021 | Sen et al. |
| 2021/0075633 | A1 | 3/2021 | Sen et al. |
| 2021/0374073 | A1* | 12/2021 | Gugnani ............. G06F 12/1081 |

OTHER PUBLICATIONS

International Search Report and Written Opinion for PCT Patent Application No. PCT/US21/51357, Mailed Jan. 6, 2022, 11 pages.
European First Office Action, (EP Exam Report Article 94(3) EPC), for Patent Application No. 21196829.2, Mailed Oct. 24, 2023, 4 pages.
"9.2.Performing Direct Memory Access (DMA) transactions", JUNGO Connectivity, WinDriver™ PCI/ISA User's Manual, Version 14.4.0, Chapter 9. Advanced Issues, https://www.jungo.com/st/support/documentation/windriver/14.4.0/wdpci_manual.mhtml/advanced_issues_dma_transaction.html, Copyright 2020 Jungo ConnectivityLtd., 14 pages.
"Chapter 9 Direct Memory Access (DMA)", Oracle, https://docs.oracle.com/cd/E19120-01/open.solaris/819-3196/6n5ed4h06/index.html, © 2010 Oracle Corporation, 25 pages.
"Direct Memory Access", ScienceDirect, https://www.sciencedirect.com/topics/computer-science/direct-memory-access, downloaded from the internet Oct. 11, 2022, 17 pages.
"RDMA Aware Networks Programming User Manual Rev 1.7", Mellanox Technoloiges, www.mellanox.com, Jun. 15, 2015, 216 pages.
"Rdma_cm(7)—Linux man page", die.net, https://linux.die.net/man/7/rdma_cm, downloaded from the internet Oct. 11, 2022, 6 pages.
"The GigaIO FabreX Memory Fabric Memory Pooling Overview", GIGAIO Technical Paper, Feb. 2020 | Rev 1.0, 8 pages.
Baker, Art, et al., "Writing a Packet-Based Slave DMA Driver", Oreilly, Windows 200 Device Driver Book: A Guide for Programmers, Second Edition, https://www.oreilly.com/library/view/windows-2000-device/0130204315/0130204315_ch12lev1sec3.html, Nov. 20, 2000, 2 pages.
Deierling, Kevin, "What Is a DPU?. . . And what's the difference between a DPU, a CPU and a GPU?", NVIDIA, https://blogs.nvidia.com/blog/2020/05/20/whats-a-dpu-data-processing-unit/, May 20, 2020, 5 pages.
Dittia, Zubin D., et al., "DMA Mechanisms for High Performance Network Interfaces", Washington University in St. Louis, Nov. 4, 2007, 15 pages.
Goodwins, Rupert, "How direct memory access speeds Ethernet", ZDNET, https://www.zdnet.com/article/how-direct-memory-access-speeds-ethernet/, May 1, 2003, 3 pages.
Jiang, Dave, "Introducing the Intel® Data Streaming Accelerator (Intel® DSA)", Intel Open Source.org, https://01.org/blogs/2019/introducing-intel-data-streaming-accelerator, Nov. 20, 2019, 6 pages.
Kauffmann, Antoine, et al., "FlexNIC: Rethinking Network DMA", University of Washington, Apr. 20, 2015, 7 pages.
First Office Action for U.S. Appl. No. 17/103,781, Mailed Dec. 18, 2023, 19 pages.

(56) References Cited

OTHER PUBLICATIONS

First Office Action for U.S. Appl. No. 17/103,602, Mailed Jan. 3, 2024, 18 pages.
First Office Action for U.S. Appl. No. 17/103,674, Mailed Jan. 3, 2024, 16 pages.
Extended European Search Report for Patent Application No. 21198323.4, Mailed Mar. 21, 2022, 7 pages.
MPI, "4.1 Introduction and Overview", https://www.mpi-forum.org/docs/mpi-1.1/mpi-11-html/node64.html, MPI-1.1, Jun. 1995, 4 pages.
European First Office Action, (EP Exam Report Article 94(3) EPC), for Patent Application No. 21198323.4, Mailed Aug. 2, 2023, 5 pages.
International Search Report and Written Opinion for PCT Patent Application No. PCT/US21/51797, Mailed Jan. 3, 2022, 11 pages.
First Office Action for U.S. Appl. No. 17/103,711, Mailed Feb. 15, 2024, 10 pages.

\* cited by examiner

NETWORK INTERFACE CONTROLLER WITH EVICTION CACHE

RELATED APPLICATION

The present application claims the benefit of priority date of U.S. provisional patent application Ser. No. 63/115,511, filed Nov. 18, 2020, the entire disclosure of which is incorporated herein by reference.

DESCRIPTION

Scale-out and distributed architectures increase computing resources or available memory or storage by adding processors, memory, and storage for access using a fabric or network. Disaggregated memory architectures can use pools of memory, located remote from the compute nodes in the system. A memory pool can be shared across a rack or set of racks in a data center. As the memory pools are remote from a compute node, there are additional latencies inherent in their accesses due to latency of packet formation and processing and media traversal across one or more network elements.

DETAILED DESCRIPTION

Figure 1:
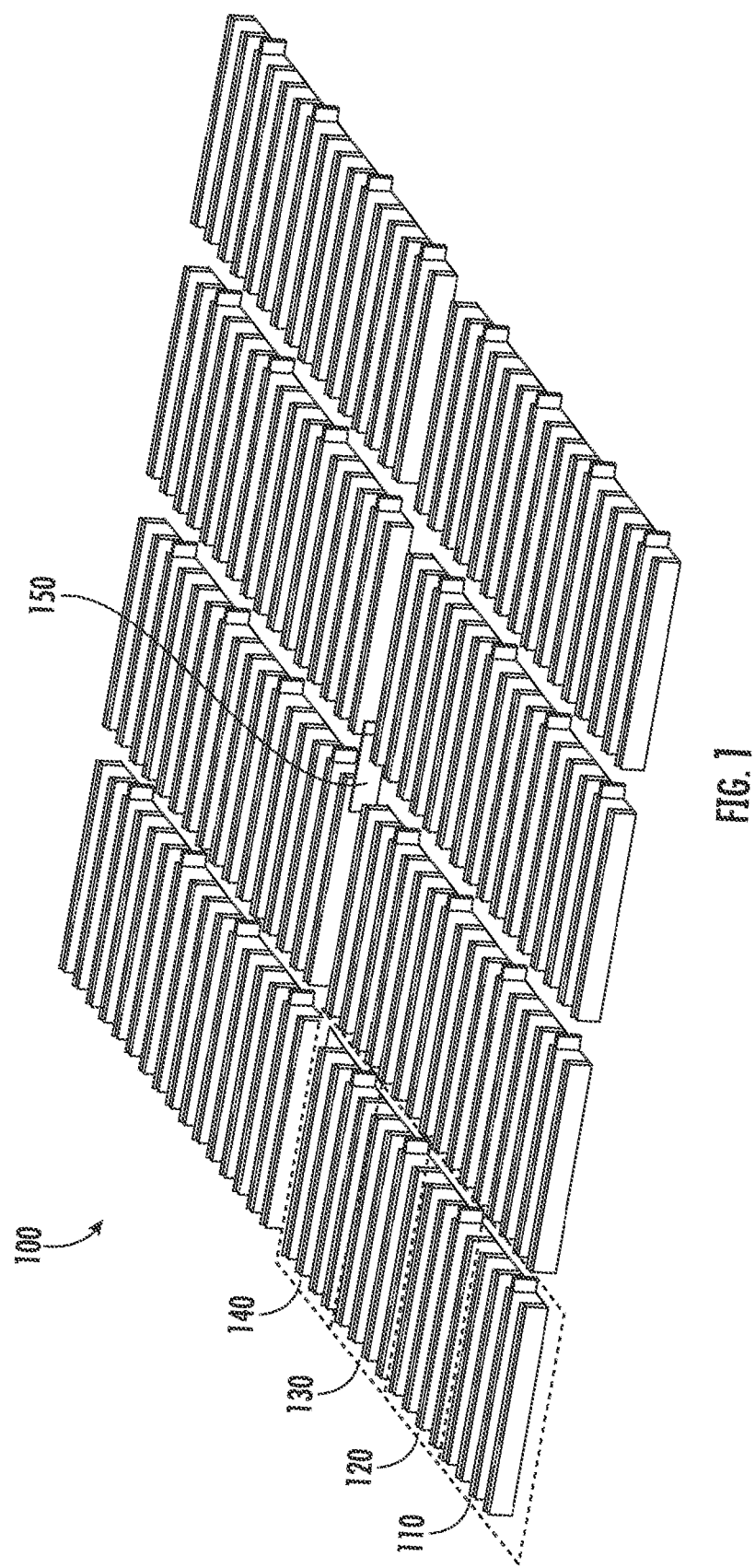
FIG. 1 is a simplified diagram of at least one embodiment of a data center for executing workloads with disaggregated resources.

FIG. 1 depicts a data center in which disaggregated resources may cooperatively execute one or more workloads (e.g., applications on behalf of customers) includes multiple pods 110, 120, 130, 140, a pod being or including one or more rows of racks. Of course, although data center 100 is shown with multiple pods, in some embodiments, the data center 100 may be embodied as a single pod. As described in more detail herein, each rack houses multiple sleds, each of which may be primarily equipped with a particular type of resource (e.g., memory devices, data storage devices, accelerator devices, general purpose processors), e.g., resources that can be logically coupled to form a composed node, which can act as, for example, a server. In the illustrative embodiment, the sleds in each pod 110, 120, 130, 140 are connected to multiple pod switches (e.g., switches that route data communications to and from sleds within the pod). The pod switches, in turn, connect with spine switches 150 that switch communications among pods (e.g., the pods 110, 120, 130, 140) in the data center 100. In some embodiments, the sleds may be connected with a fabric using Intel® Omni-Path technology. In other embodiments, the sleds may be connected with other fabrics, such as InfiniBand or Ethernet. As described in more detail herein, resources within sleds in the data center 100 may be allocated to a group (referred to herein as a "managed node") containing resources from one or more sleds to be collectively utilized in the execution of a workload. The workload can execute as if the resources belonging to the managed node were located on the same sled. The resources in a managed node may belong to sleds belonging to different racks, and even to different pods 110, 120, 130, 140. As such, some resources of a single sled may be allocated to one managed node while other resources of the same sled are allocated to a different managed node (e.g., one processor assigned to one managed node and another processor of the same sled assigned to a different managed node).

A data center comprising disaggregated resources, such as data center 100, can be used in a wide variety of contexts, such as enterprise, government, cloud service provider, and communications service provider (e.g., Telco's), as well in a wide variety of sizes, from cloud service provider mega-data centers that consume over 100,000 sq. ft. to single- or multi-rack installations for use in base stations.

The disaggregation of resources to sleds comprised predominantly of a single type of resource (e.g., compute sleds comprising primarily compute resources, memory sleds containing primarily memory resources), and the selective allocation and deallocation of the disaggregated resources to form a managed node assigned to execute a workload improves the operation and resource usage of the data center 100 relative to typical data centers comprised of hyperconverged servers containing compute, memory, storage and perhaps additional resources in a single chassis. For example, because sleds predominantly contain resources of a particular type, resources of a given type can be upgraded independently of other resources. Additionally, because different resources types (processors, storage, accelerators, etc.) typically have different refresh rates, greater resource utilization and reduced total cost of ownership may be achieved. For example, a data center operator can upgrade the processors throughout their facility by only swapping out the compute sleds. In such a case, accelerator and storage resources may not be contemporaneously upgraded and, rather, may be allowed to continue operating until those resources are scheduled for their own refresh. Resource utilization may also increase. For example, if managed nodes are composed based on requirements of the workloads that will be running on them, resources within a node are more likely to be fully utilized. Such utilization may allow for more managed nodes to run in a data center with a given set of resources, or for a data center expected to run a given set of workloads, to be built using fewer resources.

Figure 2:
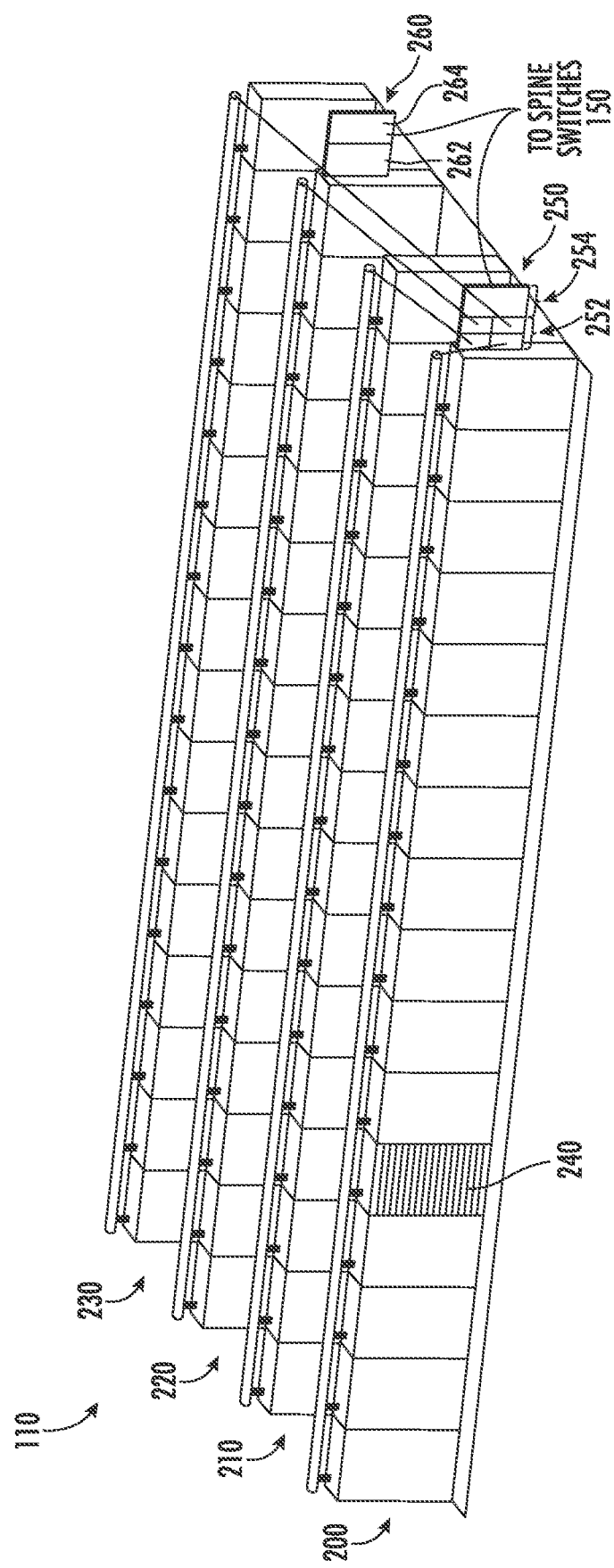
FIG. 2 is a simplified diagram of at least one embodiment of a pod that may be included in a data center.

FIG. 2 depicts a pod. A pod can include a set of rows 200, 210, 220, 230 of racks 240. Each rack 240 may house multiple sleds (e.g., sixteen sleds) and provide power and data connections to the housed sleds, as described in more detail herein. In the illustrative embodiment, the racks in each row 200, 210, 220, 230 are connected to multiple pod switches 250, 260. The pod switch 250 includes a set of ports 252 to which the sleds of the racks of the pod 110 are connected and another set of ports 254 that connect the pod 110 to the spine switches 150 to provide connectivity to other pods in the data center 100. Similarly, the pod switch 260 includes a set of ports 262 to which the sleds of the racks of the pod 110 are connected and a set of ports 264 that connect the pod 110 to the spine switches 150. As such, the use of the pair of switches 250, 260 provides an amount of redundancy to the pod 110. For example, if either of the switches 250, 260 fails, the sleds in the pod 110 may still maintain data communication with the remainder of the data center 100 (e.g., sleds of other pods) through the other switch 250, 260. Furthermore, in the illustrative embodiment, the switches 150, 250, 260 may be embodied as dual-mode optical switches, capable of routing both Ethernet protocol communications carrying Internet Protocol (IP) packets and communications according to a second, high-performance link-layer protocol (e.g., PCI Express) via optical signaling media of an optical fabric.

It should be appreciated that each of the other pods 120, 130, 140 (as well as any additional pods of the data center 100) may be similarly structured as, and have components similar to, the pod 110 shown in and described in regard to FIG. 2 (e.g., each pod may have rows of racks housing multiple sleds as described above). Additionally, while two pod switches 250, 260 are shown, it should be understood that in other embodiments, each pod 110, 120, 130, 140 may be connected to a different number of pod switches, providing even more failover capacity. Of course, in other embodiments, pods may be arranged differently than the rows-of-racks configuration shown in FIGS. 1-2. For example, a pod may be embodied as multiple sets of racks in which each set of racks is arranged radially, e.g., the racks are equidistant from a center switch.

Figure 3:
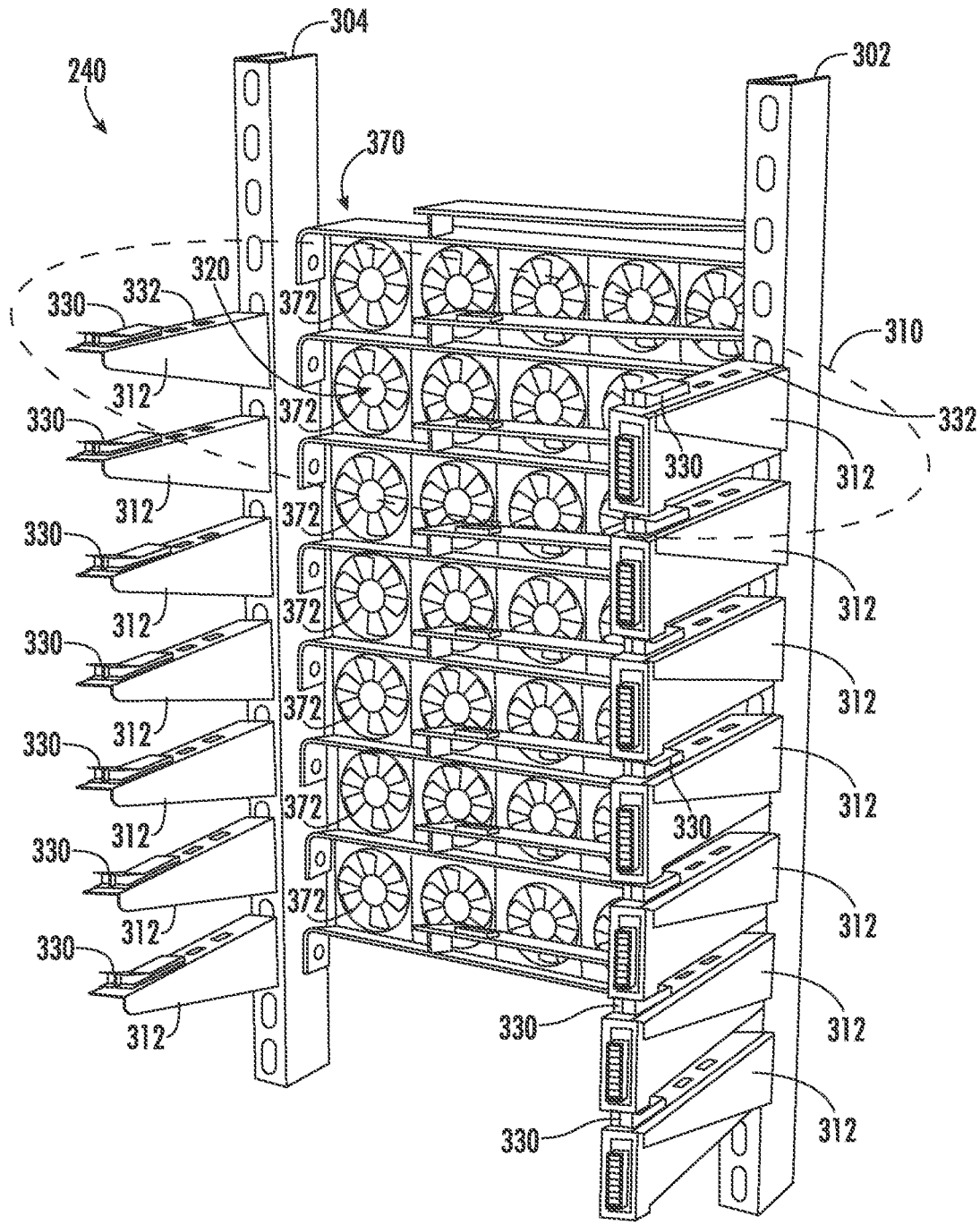
FIG. 3 is a perspective view of at least one embodiment of a rack that may be included in a pod.
Figure 4:
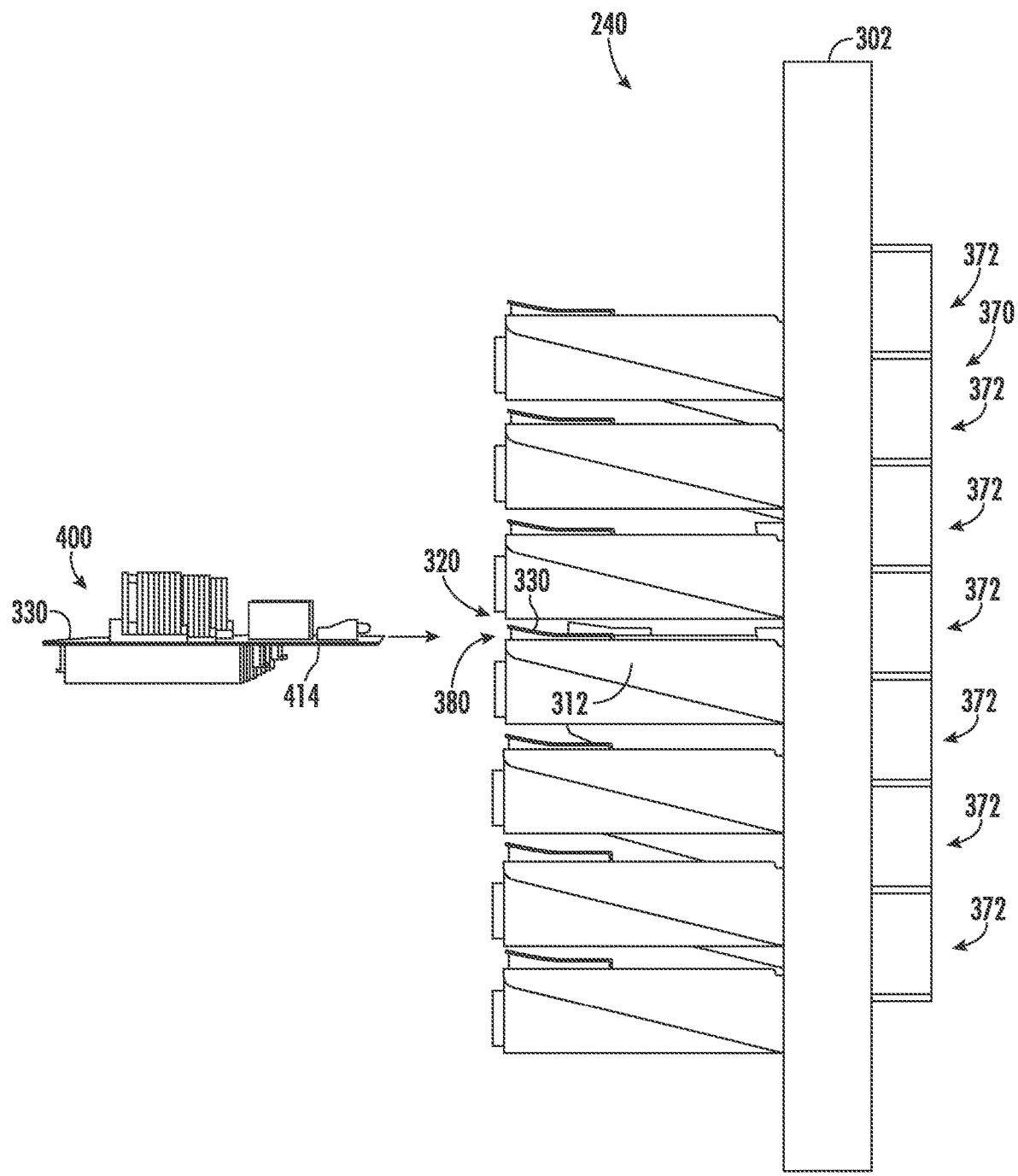
FIG. 4 is a side elevation view of a rack.
Figure 5:
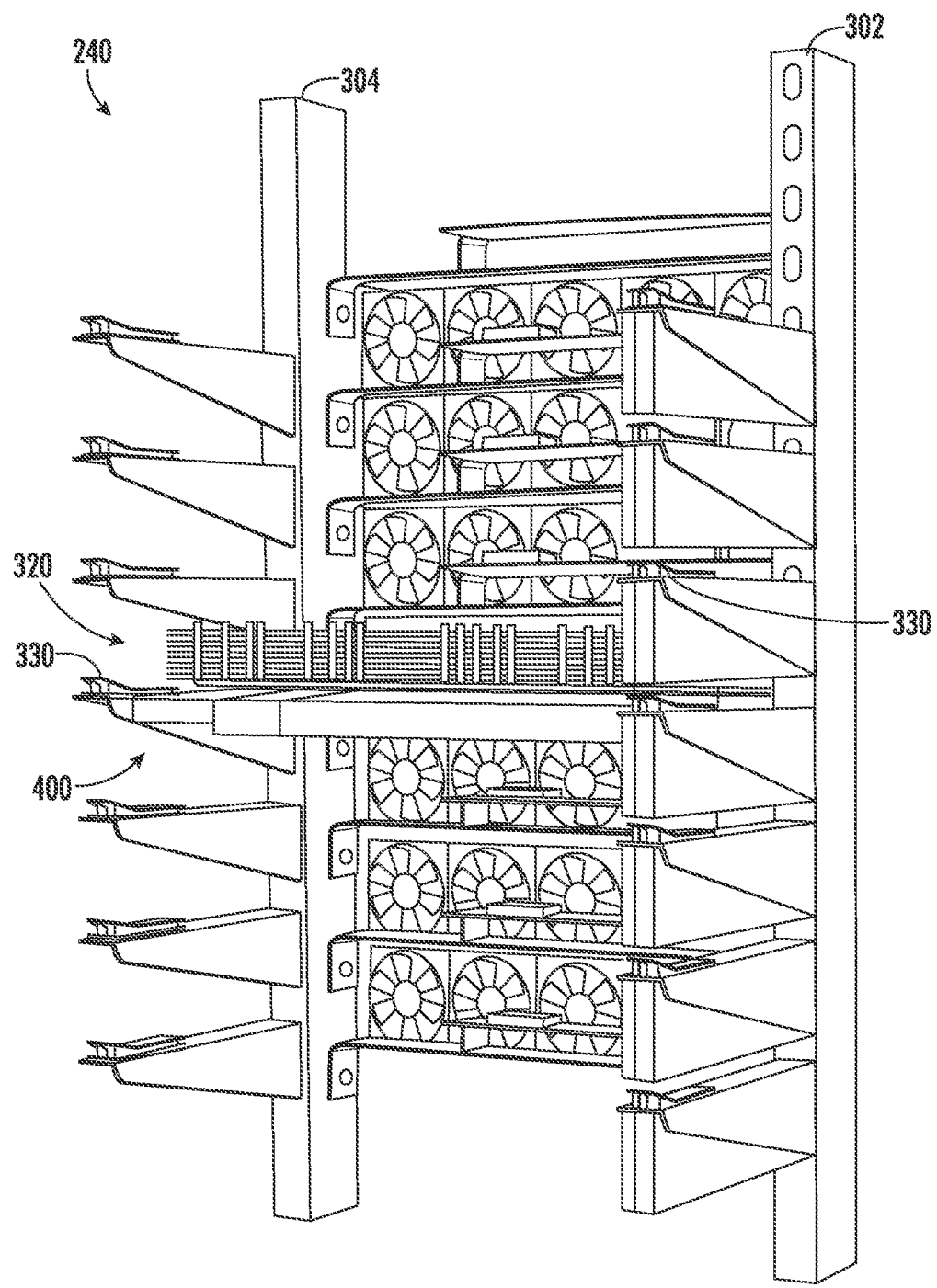
FIG. 5 is a perspective view of a rack having a sled mounted therein.

Referring now to FIGS. 3-5, each illustrative rack 240 of the data center 100 includes two elongated support posts 302, 304, which are arranged vertically. For example, the elongated support posts 302, 304 may extend upwardly from a floor of the data center 100 when deployed. The rack 240 also includes one or more horizontal pairs 310 of elongated support arms 312 (identified in FIG. 3 via a dashed ellipse) configured to support a sled of the data center 100 as discussed below. One elongated support arm 312 of the pair of elongated support arms 312 extends outwardly from the elongated support post 302 and the other elongated support arm 312 extends outwardly from the elongated support post 304.

In the illustrative embodiments, each sled of the data center 100 is embodied as a chassis-less sled. That is, each sled has a chassis-less circuit board substrate on which physical resources (e.g., processors, memory, accelerators, storage, etc.) are mounted as discussed in more detail below. As such, the rack 240 is configured to receive the chassis-less sleds. For example, each pair 310 of elongated support arms 312 defines a sled slot 320 of the rack 240, which is configured to receive a corresponding chassis-less sled. To do so, each illustrative elongated support arm 312 includes a circuit board guide 330 configured to receive the chassis-less circuit board substrate of the sled. Each circuit board guide 330 is secured to, or otherwise mounted to, a top side 332 of the corresponding elongated support arm 312. For example, in the illustrative embodiment, each circuit board guide 330 is mounted at a distal end of the corresponding elongated support arm 312 relative to the corresponding elongated support post 302, 304. For clarity of the Figures, not every circuit board guide 330 may be referenced in each Figure.

Each circuit board guide 330 includes an inner wall that defines a circuit board slot 380 configured to receive the chassis-less circuit board substrate of a sled 400 when the sled 400 is received in the corresponding sled slot 320 of the rack 240. To do so, as shown in FIG. 4, a user (or robot) aligns the chassis-less circuit board substrate of an illustrative chassis-less sled 400 to a sled slot 320. The user, or robot, may then slide the chassis-less circuit board substrate forward into the sled slot 320 such that each side edge 414 of the chassis-less circuit board substrate is received in a corresponding circuit board slot 380 of the circuit board guides 330 of the pair 310 of elongated support arms 312 that define the corresponding sled slot 320 as shown in FIG. 4. By having robotically accessible and robotically manipulatable sleds comprising disaggregated resources, each type of resource can be upgraded independently of each other and at their own optimized refresh rate. Furthermore, the sleds are configured to blindly mate with power and data communication cables in each rack 240, enhancing their ability to be quickly removed, upgraded, reinstalled, and/or replaced. As such, in some embodiments, the data center 100 may operate (e.g., execute workloads, undergo maintenance and/or upgrades, etc.) without human involvement on the data center floor. In other embodiments, a human may facilitate one or more maintenance or upgrade operations in the data center 100.

It should be appreciated that each circuit board guide 330 is dual sided. That is, each circuit board guide 330 includes an inner wall that defines a circuit board slot 380 on each side of the circuit board guide 330. In this way, each circuit board guide 330 can support a chassis-less circuit board substrate on either side. As such, a single additional elongated support post may be added to the rack 240 to turn the rack 240 into a two-rack solution that can hold twice as many sled slots 320 as shown in FIG. 3. The illustrative rack 240 includes seven pairs 310 of elongated support arms 312 that define a corresponding seven sled slots 320, each configured to receive and support a corresponding sled 400 as discussed above. Of course, in other embodiments, the rack 240 may include additional or fewer pairs 310 of elongated support arms 312 (e.g., additional or fewer sled slots 320). It should be appreciated that because the sled 400 is chassis-less, the sled 400 may have an overall height that is different than typical servers. As such, in some embodiments, the height of each sled slot 320 may be shorter than the height of a typical server (e.g., shorter than a single rank unit, "1U"). That is, the vertical distance between each pair 310 of elongated support arms 312 may be less than a standard rack unit "1U." Additionally, due to the relative decrease in height of the sled slots 320, the overall height of the rack 240 in some embodiments may be shorter than the height of traditional rack enclosures. For example, in some embodiments, each of the elongated support posts 302, 304 may have a length of six feet or less. Again, in other embodiments, the rack 240 may have different dimensions. For example, in some embodiments, the vertical distance between each pair 310 of elongated support arms 312 may be greater than a standard rack until "1U". In such embodiments, the increased vertical distance between the sleds allows for larger heat sinks to be attached to the physical resources and for larger fans to be used (e.g., in the fan array 370 described below) for cooling each sled, which in turn can allow the physical resources to operate at increased power levels. Further, it should be appreciated that the rack 240 does not include any walls, enclosures, or the like. Rather, the rack 240 is an enclosure-less rack that is opened to the local environment. Of course, in some cases, an end plate may be attached to one of the elongated support posts 302, 304 in those situations in which the rack 240 forms an end-of-row rack in the data center 100.

In some embodiments, various interconnects may be routed upwardly or downwardly through the elongated support posts 302, 304. To facilitate such routing, each elongated support post 302, 304 includes an inner wall that defines an inner chamber in which interconnects may be located. The interconnects routed through the elongated support posts 302, 304 may be embodied as any type of interconnects including, but not limited to, data or communication interconnects to provide communication connections to each sled slot 320, power interconnects to provide power to each sled slot 320, and/or other types of interconnects.

The rack 240, in the illustrative embodiment, includes a support platform on which a corresponding optical data connector (not shown) is mounted. Each optical data connector is associated with a corresponding sled slot 320 and is configured to mate with an optical data connector of a corresponding sled 400 when the sled 400 is received in the corresponding sled slot 320. In some embodiments, optical connections between components (e.g., sleds, racks, and switches) in the data center 100 are made with a blind mate optical connection. For example, a door on each cable may prevent dust from contaminating the fiber inside the cable. In the process of connecting to a blind mate optical connector mechanism, the door is pushed open when the end of the cable approaches or enters the connector mechanism. Subsequently, the optical fiber inside the cable may enter a gel within the connector mechanism and the optical fiber of one cable comes into contact with the optical fiber of another cable within the gel inside the connector mechanism.

The illustrative rack 240 also includes a fan array 370 coupled to the cross-support arms of the rack 240. The fan array 370 includes one or more rows of cooling fans 372, which are aligned in a horizontal line between the elongated support posts 302, 304. In the illustrative embodiment, the fan array 370 includes a row of cooling fans 372 for each sled slot 320 of the rack 240. As discussed above, each sled 400 does not include any on-board cooling system in the illustrative embodiment and, as such, the fan array 370 provides cooling for each sled 400 received in the rack 240. Each rack 240, in the illustrative embodiment, also includes a power supply associated with each sled slot 320. Each power supply is secured to one of the elongated support arms 312 of the pair 310 of elongated support arms 312 that define the corresponding sled slot 320. For example, the rack 240 may include a power supply coupled or secured to each elongated support arm 312 extending from the elongated support post 302. Each power supply includes a power connector configured to mate with a power connector of the sled 400 when the sled 400 is received in the corresponding sled slot 320. In the illustrative embodiment, the sled 400 does not include any on-board power supply and, as such, the power supplies provided in the rack 240 supply power to corresponding sleds 400 when mounted to the rack 240.

Each power supply is configured to satisfy the power requirements for its associated sled, which can vary from sled to sled. Additionally, the power supplies provided in the rack 240 can operate independent of each other. That is, within a single rack, a first power supply providing power to a compute sled can provide power levels that are different than power levels supplied by a second power supply providing power to an accelerator sled. The power supplies may be controllable at the sled level or rack level, and may be controlled locally by components on the associated sled or remotely, such as by another sled or an orchestrator.

Figure 6:
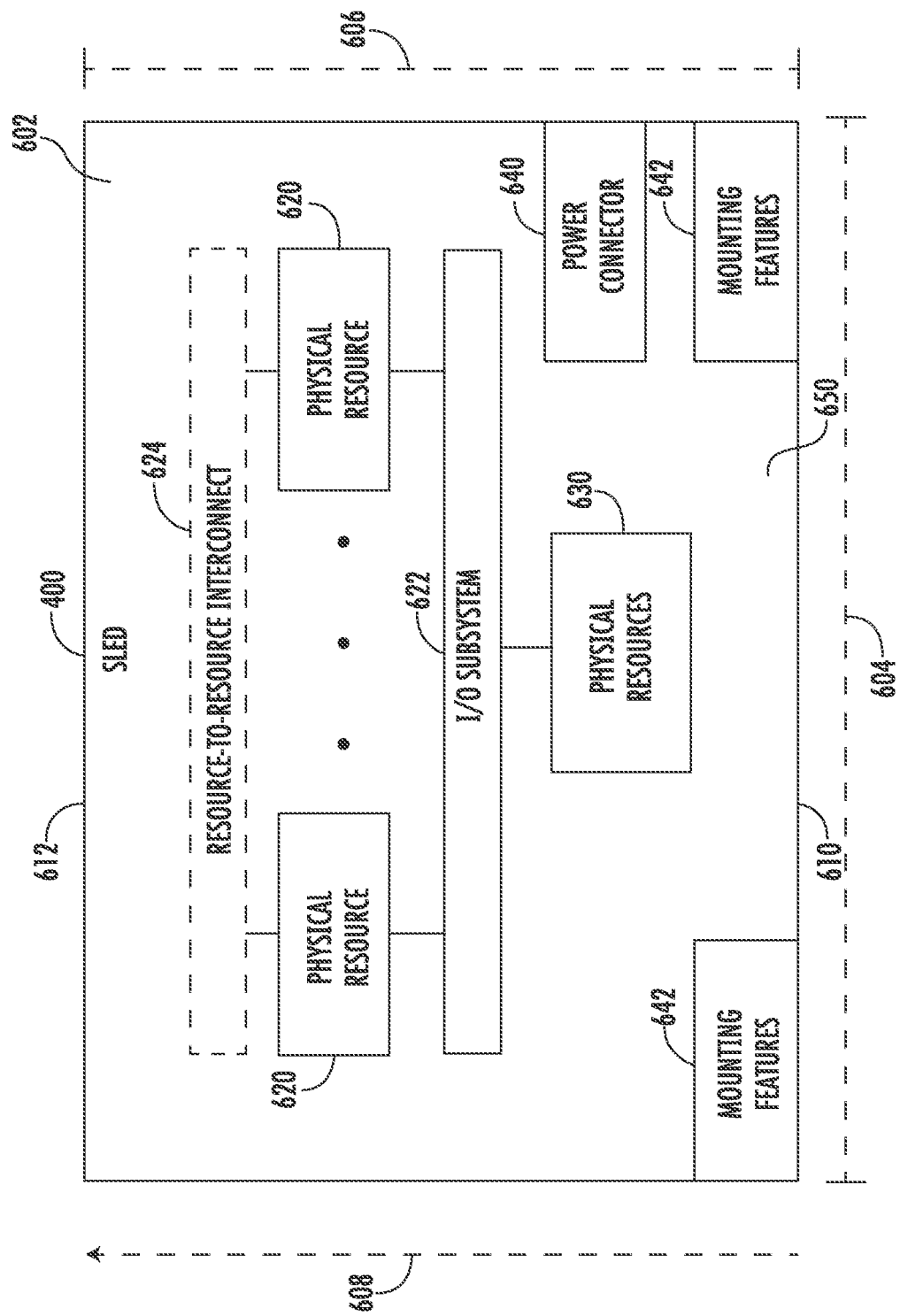
FIG. 6 is a simplified block diagram of at least one embodiment of a top side of a sled.

Referring now to FIG. 6, the sled 400, in the illustrative embodiment, is configured to be mounted in a corresponding rack 240 of the data center 100 as discussed above. In some embodiments, each sled 400 may be optimized or otherwise configured for performing particular tasks, such as compute tasks, acceleration tasks, data storage tasks, etc. For example, the sled 400 may be embodied as a compute sled 800 as discussed below in regard to FIGS. 8-9, an accelerator sled 1000 as discussed below in regard to FIGS. 10-11, a storage sled 1200 as discussed below in regard to FIGS. 12-13, or as a sled optimized or otherwise configured to perform other specialized tasks, such as a memory sled 1400, discussed below in regard to FIG. 14.

As discussed above, the illustrative sled 400 includes a chassis-less circuit board substrate 602, which supports various physical resources (e.g., electrical components) mounted thereon. It should be appreciated that the circuit board substrate 602 is "chassis-less" in that the sled 400 does not include a housing or enclosure. Rather, the chassis-less circuit board substrate 602 is open to the local environment. The chassis-less circuit board substrate 602 may be formed from any material capable of supporting the various electrical components mounted thereon. For example, in an illustrative embodiment, the chassis-less circuit board substrate 602 is formed from an FR-4 glass-reinforced epoxy laminate material. Of course, other materials may be used to form the chassis-less circuit board substrate 602 in other embodiments.

As discussed in more detail below, the chassis-less circuit board substrate 602 includes multiple features that improve the thermal cooling characteristics of the various electrical components mounted on the chassis-less circuit board substrate 602. As discussed, the chassis-less circuit board substrate 602 does not include a housing or enclosure, which may improve the airflow over the electrical components of the sled 400 by reducing those structures that may inhibit air flow. For example, because the chassis-less circuit board substrate 602 is not positioned in an individual housing or enclosure, there is no vertically-arranged backplane (e.g., a backplate of the chassis) attached to the chassis-less circuit board substrate 602, which could inhibit air flow across the electrical components. Additionally, the chassis-less circuit board substrate 602 has a geometric shape configured to reduce the length of the airflow path across the electrical components mounted to the chassis-less circuit board substrate 602. For example, the illustrative chassis-less circuit board substrate 602 has a width 604 that is greater than a depth 606 of the chassis-less circuit board substrate 602. In one particular embodiment, for example, the chassis-less circuit board substrate 602 has a width of about 21 inches and a depth of about 9 inches, compared to a typical server that has a width of about 17 inches and a depth of about 39 inches. As such, an airflow path 608 that extends from a front edge 610 of the chassis-less circuit board substrate 602 toward a rear edge 612 has a shorter distance relative to typical servers, which may improve the thermal cooling characteristics of the sled 400. Furthermore, although not illustrated in FIG. 6, the various physical resources mounted to the chassis-less circuit board substrate 602 are mounted in corresponding locations such that no two substantively heat-producing electrical components shadow each other as discussed in more detail below. That is, no two electrical components, which produce appreciable heat during operation (e.g., greater than a nominal heat sufficient enough to adversely impact the cooling of another electrical component), are mounted to the chassis-less circuit board substrate 602 linearly in-line with each other along the direction of the airflow path 608 (e.g., along a direction extending from the front edge 610 toward the rear edge 612 of the chassis-less circuit board substrate 602).

As discussed above, the illustrative sled 400 includes one or more physical resources 620 mounted to a top side 650 of the chassis-less circuit board substrate 602. Although two physical resources 620 are shown in FIG. 6, it should be appreciated that the sled 400 may include one, two, or more physical resources 620 in other embodiments. The physical resources 620 may be embodied as any type of processor, controller, or other compute circuit capable of performing various tasks such as compute functions and/or controlling the functions of the sled 400 depending on, for example, the type or intended functionality of the sled 400. For example, as discussed in more detail below, the physical resources 620 may be embodied as high-performance processors in embodiments in which the sled 400 is embodied as a compute sled, as accelerator co-processors or circuits in embodiments in which the sled 400 is embodied as an accelerator sled, storage controllers in embodiments in which the sled 400 is embodied as a storage sled, or a set of memory devices in embodiments in which the sled 400 is embodied as a memory sled.

The sled 400 also includes one or more additional physical resources 630 mounted to the top side 650 of the chassis-less circuit board substrate 602. In the illustrative embodiment, the additional physical resources include a network interface controller (NIC) as discussed in more detail below. Of course, depending on the type and functionality of the sled 400, the physical resources 630 may include additional or other electrical components, circuits, and/or devices in other embodiments.

The physical resources 620 are communicatively coupled to the physical resources 630 via an input/output (I/O) subsystem 622. The I/O subsystem 622 may be embodied as circuitry and/or components to facilitate input/output operations with the physical resources 620, the physical resources 630, and/or other components of the sled 400. For example, the I/O subsystem 622 may be embodied as, or otherwise include, memory controller hubs, input/output control hubs, integrated sensor hubs, firmware devices, communication links (e.g., point-to-point links, bus links, wires, cables, waveguides, light guides, printed circuit board traces, etc.), and/or other components and subsystems to facilitate the input/output operations. In the illustrative embodiment, the I/O subsystem 622 is embodied as, or otherwise includes, a double data rate 4 (DDR4) data bus or a DDR5 data bus.

In some embodiments, the sled 400 may also include a resource-to-resource interconnect 624. The resource-to-resource interconnect 624 may be embodied as any type of communication interconnect capable of facilitating resource-to-resource communications. In the illustrative embodiment, the resource-to-resource interconnect 624 is embodied as a high-speed point-to-point interconnect (e.g., faster than the I/O subsystem 622). For example, the resource-to-resource interconnect 624 may be embodied as a QuickPath Interconnect (QPI), an UltraPath Interconnect (UPI), PCI express (PCIe), or other high-speed point-to-point interconnect dedicated to resource-to-resource communications.

The sled 400 also includes a power connector 640 configured to mate with a corresponding power connector of the rack 240 when the sled 400 is mounted in the corresponding rack 240. The sled 400 receives power from a power supply of the rack 240 via the power connector 640 to supply power to the various electrical components of the sled 400. That is, the sled 400 does not include any local power supply (e.g., an on-board power supply) to provide power to the electrical components of the sled 400. The exclusion of a local or on-board power supply facilitates the reduction in the overall footprint of the chassis-less circuit board substrate 602, which may increase the thermal cooling characteristics of the various electrical components mounted on the chassis-less circuit board substrate 602 as discussed above. In some embodiments, voltage regulators are placed on a bottom side 750 (see FIG. 7) of the chassis-less circuit board substrate 602 directly opposite of the processors 820 (see FIG. 8), and power is routed from the voltage regulators to the processors 820 by vias extending through the circuit board substrate 602. Such a configuration provides an increased thermal budget, additional current and/or voltage, and better voltage control relative to typical printed circuit boards in which processor power is delivered from a voltage regulator, in part, by printed circuit traces.

In some embodiments, the sled 400 may also include mounting features 642 configured to mate with a mounting arm, or other structure, of a robot to facilitate the placement of the sled 600 in a rack 240 by the robot. The mounting features 642 may be embodied as any type of physical structures that allow the robot to grasp the sled 400 without damaging the chassis-less circuit board substrate 602 or the electrical components mounted thereto. For example, in some embodiments, the mounting features 642 may be embodied as non-conductive pads attached to the chassis-less circuit board substrate 602. In other embodiments, the mounting features may be embodied as brackets, braces, or other similar structures attached to the chassis-less circuit board substrate 602. The particular number, shape, size, and/or make-up of the mounting feature 642 may depend on the design of the robot configured to manage the sled 400.

Figure 7:
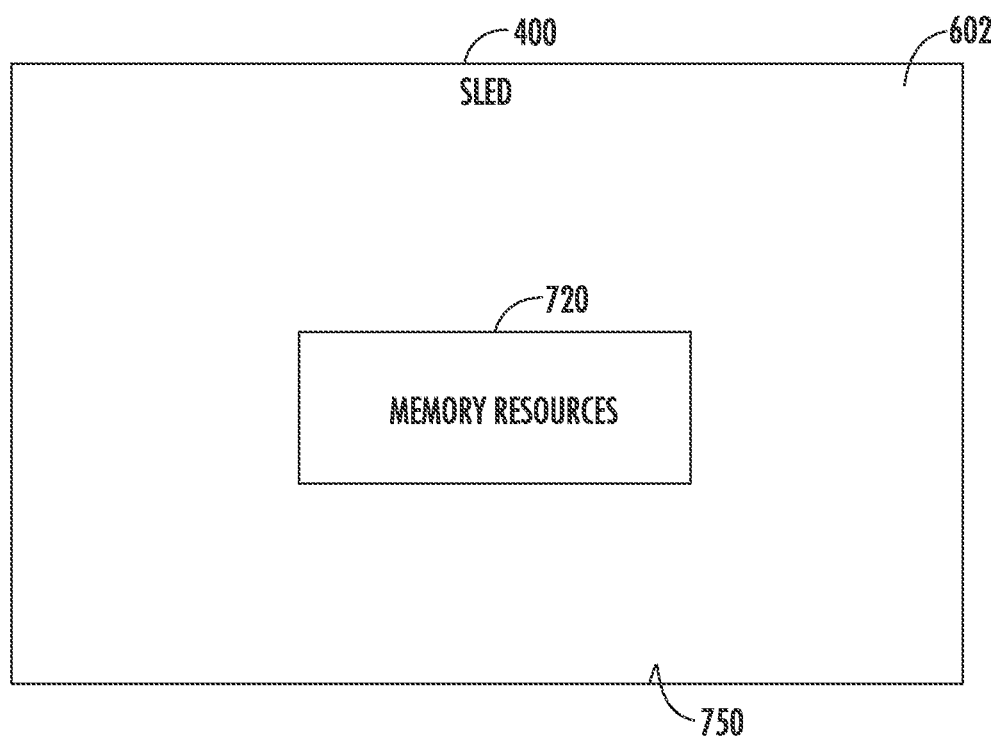
FIG. 7 is a simplified block diagram of at least one embodiment of a bottom side of a sled.

Referring now to FIG. 7, in addition to the physical resources 630 mounted on the top side 650 of the chassis-less circuit board substrate 602, the sled 400 also includes one or more memory devices 720 mounted to a bottom side 750 of the chassis-less circuit board substrate 602. That is, the chassis-less circuit board substrate 602 is embodied as a double-sided circuit board. The physical resources 620 are communicatively coupled to the memory devices 720 via the I/O subsystem 622. For example, the physical resources 620 and the memory devices 720 may be communicatively coupled by one or more vias extending through the chassis-less circuit board substrate 602. Each physical resource 620 may be communicatively coupled to a different set of one or more memory devices 720 in some embodiments. Alternatively, in other embodiments, each physical resource 620 may be communicatively coupled to each memory device 720.

The memory devices 720 may be embodied as any type of memory device capable of storing data for the physical resources 620 during operation of the sled 400, such as any type of volatile (e.g., dynamic random access memory (DRAM), etc.) or non-volatile memory. Volatile memory may be a storage medium that requires power to maintain the state of data stored by the medium. Non-limiting examples of volatile memory may include various types of random access memory (RAM), such as dynamic random access memory (DRAM) or static random access memory (SRAM). One particular type of DRAM that may be used in a memory module is synchronous dynamic random access memory (SDRAM). In particular embodiments, DRAM of a memory component may comply with a standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Such standards (and similar standards) may be referred to as DDR-based standards and communication interfaces of the storage devices that implement such standards may be referred to as DDR-based interfaces.

In one embodiment, the memory device is a block addressable memory device, such as those based on NAND or NOR technologies. A block can be any size such as but not limited to 2 KB, 4 KB, 8 KB, and so forth. A memory device may also include next-generation nonvolatile devices, such as Intel Optane® memory or other byte addressable write-in-place nonvolatile memory devices. In one embodiment, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory. The memory device may refer to the die itself and/or to a packaged memory product. In some embodiments, the memory device may comprise a transistor-less stackable cross point architecture in which memory cells sit at the intersection of word lines and bit lines and are individually addressable and in which bit storage is based on a change in bulk resistance.

Figure 8:
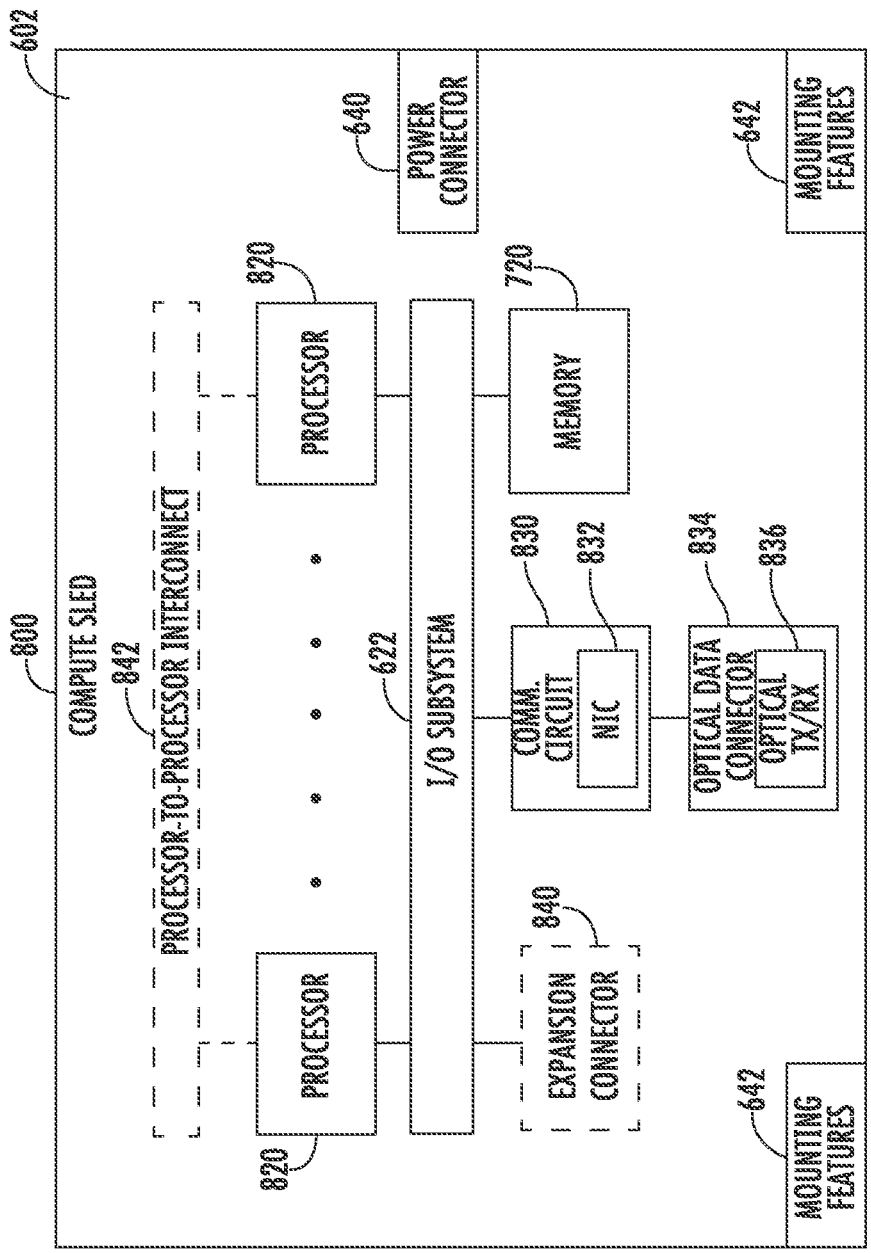
FIG. 8 is a simplified block diagram of at least one embodiment of a compute sled.

Referring now to FIG. 8, in some embodiments, the sled 400 may be embodied as a compute sled 800. The compute sled 800 is optimized, or otherwise configured, to perform compute tasks. Of course, as discussed above, the compute sled 800 may rely on other sleds, such as acceleration sleds and/or storage sleds, to perform such compute tasks. The compute sled 800 includes various physical resources (e.g., electrical components) similar to the physical resources of the sled 400, which have been identified in FIG. 8 using the same reference numbers. The description of such components provided above in regard to FIGS. 6 and 7 applies to the corresponding components of the compute sled 800 and is not repeated herein for clarity of the description of the compute sled 800.

In the illustrative compute sled 800, the physical resources 620 are embodied as processors 820. Although only two processors 820 are shown in FIG. 8, it should be appreciated that the compute sled 800 may include additional processors 820 in other embodiments. Illustratively, the processors 820 are embodied as high-performance processors 820 and may be configured to operate at a relatively high power rating. Although the processors 820 generate additional heat operating at power ratings greater than typical processors (which operate at around 155-230 W), the enhanced thermal cooling characteristics of the chassis-less circuit board substrate 602 discussed above facilitate the higher power operation. For example, in the illustrative embodiment, the processors 820 are configured to operate at a power rating of at least 250 W. In some embodiments, the processors 820 may be configured to operate at a power rating of at least 350 W.

In some embodiments, the compute sled 800 may also include a processor-to-processor interconnect 842. Similar to the resource-to-resource interconnect 624 of the sled 400 discussed above, the processor-to-processor interconnect 842 may be embodied as any type of communication interconnect capable of facilitating processor-to-processor interconnect 842 communications. In the illustrative embodiment, the processor-to-processor interconnect 842 is embodied as a high-speed point-to-point interconnect (e.g., faster than the I/O subsystem 622). For example, the processor-to-processor interconnect 842 may be embodied as a QuickPath Interconnect (QPI), an UltraPath Interconnect (UPI), or other high-speed point-to-point interconnect dedicated to processor-to-processor communications (e.g., PCIe).

The compute sled 800 also includes a communication circuit 830. The illustrative communication circuit 830 includes a network interface controller (NIC) 832, which may also be referred to as a host fabric interface (HFI). The NIC 832 may be embodied as, or otherwise include, any type of integrated circuit, discrete circuits, controller chips, chipsets, add-in-boards, daughtercards, network interface cards, or other devices that may be used by the compute sled 800 to connect with another compute device (e.g., with other sleds 400). In some embodiments, the NIC 832 may be embodied as part of a system-on-a-chip (SoC) that includes one or more processors, or included on a multichip package that also contains one or more processors. In some embodiments, the NIC 832 may include a local processor (not shown) and/or a local memory (not shown) that are both local to the NIC 832. In such embodiments, the local processor of the NIC 832 may be capable of performing one or more of the functions of the processors 820. Additionally or alternatively, in such embodiments, the local memory of the NIC 832 may be integrated into one or more components of the compute sled at the board level, socket level, chip level, and/or other levels. In some examples, a network interface includes a network interface controller or a network interface card. In some examples, a network interface can include one or more of a network interface controller (NIC) 832, a host fabric interface (HFI), a host bus adapter (HBA), network interface connected to a bus or connection (e.g., PCIe, CXL, DDR, and so forth). In some examples, a network interface can be part of a switch or a system-on-chip (SoC).

The communication circuit 830 is communicatively coupled to an optical data connector 834. The optical data connector 834 is configured to mate with a corresponding optical data connector of the rack 240 when the compute sled 800 is mounted in the rack 240. Illustratively, the optical data connector 834 includes a plurality of optical fibers which lead from a mating surface of the optical data connector 834 to an optical transceiver 836. The optical transceiver 836 is configured to convert incoming optical signals from the rack-side optical data connector to electrical signals and to convert electrical signals to outgoing optical signals to the rack-side optical data connector. Although shown as forming part of the optical data connector 834 in the illustrative embodiment, the optical transceiver 836 may form a portion of the communication circuit 830 in other embodiments.

In some embodiments, the compute sled 800 may also include an expansion connector 840. In such embodiments, the expansion connector 840 is configured to mate with a corresponding connector of an expansion chassis-less circuit board substrate to provide additional physical resources to the compute sled 800. The additional physical resources may be used, for example, by the processors 820 during operation of the compute sled 800. The expansion chassis-less circuit board substrate may be substantially similar to the chassis-less circuit board substrate 602 discussed above and may include various electrical components mounted thereto. The particular electrical components mounted to the expansion chassis-less circuit board substrate may depend on the intended functionality of the expansion chassis-less circuit board substrate. For example, the expansion chassis-less circuit board substrate may provide additional compute resources, memory resources, and/or storage resources. As such, the additional physical resources of the expansion chassis-less circuit board substrate may include, but is not limited to, processors, memory devices, storage devices, and/or accelerator circuits including, for example, field programmable gate arrays (FPGA), application-specific integrated circuits (ASICs), security co-processors, graphics processing units (GPUs), machine learning circuits, or other specialized processors, controllers, devices, and/or circuits.

Figure 9:
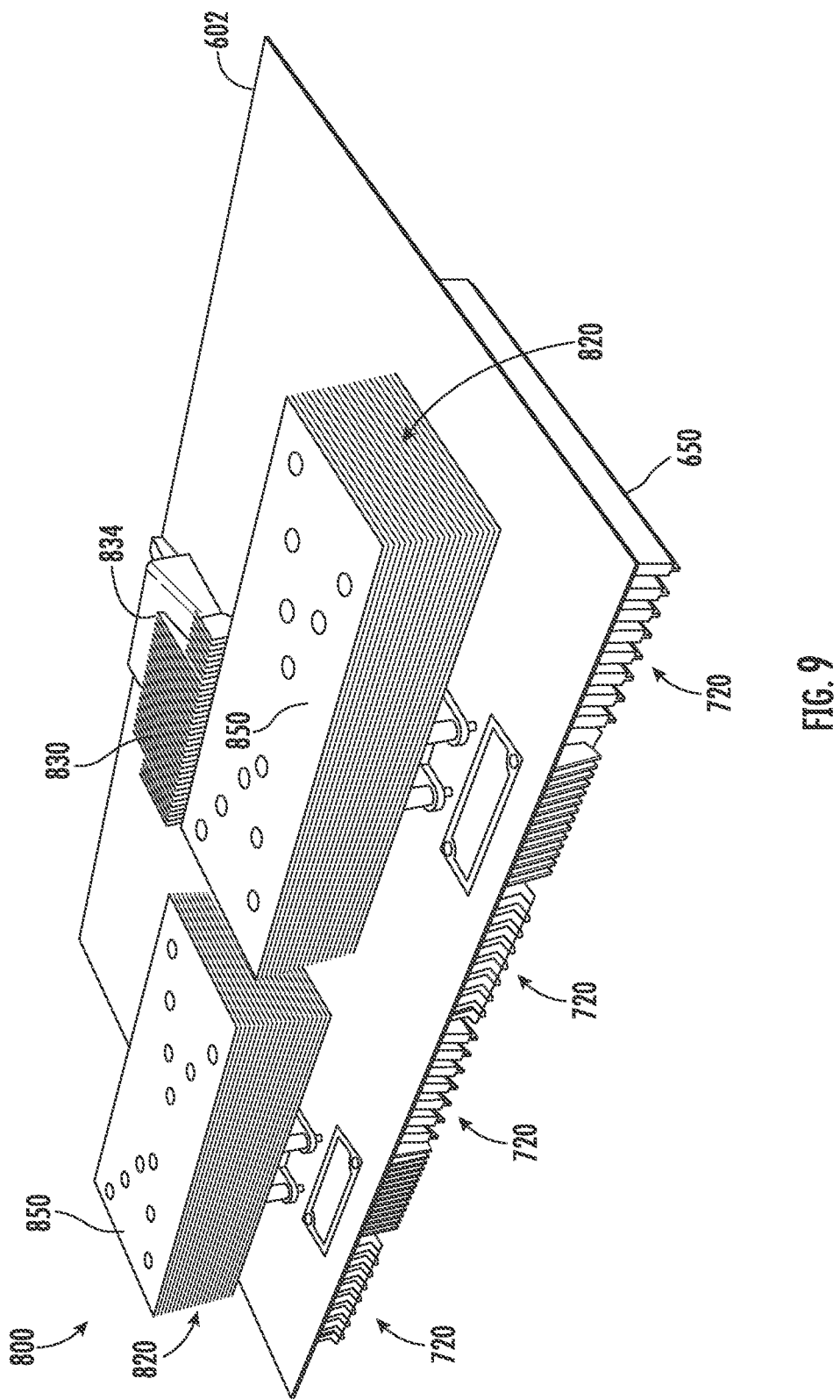
FIG. 9 is a top perspective view of at least one embodiment of a compute sled.

Referring now to FIG. 9, an illustrative embodiment of the compute sled 800 is shown. As shown, the processors 820, communication circuit 830, and optical data connector 834 are mounted to the top side 650 of the chassis-less circuit board substrate 602. Any suitable attachment or mounting technology may be used to mount the physical resources of the compute sled 800 to the chassis-less circuit board substrate 602. For example, the various physical resources may be mounted in corresponding sockets (e.g., a processor socket), holders, or brackets. In some cases, some of the electrical components may be directly mounted to the chassis-less circuit board substrate 602 via soldering or similar techniques.

As discussed above, the individual processors 820 and communication circuit 830 are mounted to the top side 650 of the chassis-less circuit board substrate 602 such that no two heat-producing, electrical components shadow each other. In the illustrative embodiment, the processors 820 and communication circuit 830 are mounted in corresponding locations on the top side 650 of the chassis-less circuit board substrate 602 such that no two of those physical resources are linearly in-line with others along the direction of the airflow path 608. It should be appreciated that, although the optical data connector 834 is in-line with the communication circuit 830, the optical data connector 834 produces no or nominal heat during operation.

The memory devices 720 of the compute sled 800 are mounted to the bottom side 750 of the of the chassis-less circuit board substrate 602 as discussed above in regard to the sled 400. Although mounted to the bottom side 750, the memory devices 720 are communicatively coupled to the processors 820 located on the top side 650 via the I/O subsystem 622. Because the chassis-less circuit board substrate 602 is embodied as a double-sided circuit board, the memory devices 720 and the processors 820 may be communicatively coupled by one or more vias, connectors, or other mechanisms extending through the chassis-less circuit board substrate 602. Of course, each processor 820 may be communicatively coupled to a different set of one or more memory devices 720 in some embodiments. Alternatively, in other embodiments, each processor 820 may be communicatively coupled to each memory device 720. In some embodiments, the memory devices 720 may be mounted to one or more memory mezzanines on the bottom side of the chassis-less circuit board substrate 602 and may interconnect with a corresponding processor 820 through a ball-grid array.

Each of the processors 820 includes a heatsink 850 secured thereto. Due to the mounting of the memory devices 720 to the bottom side 750 of the chassis-less circuit board substrate 602 (as well as the vertical spacing of the sleds 400 in the corresponding rack 240), the top side 650 of the chassis-less circuit board substrate 602 includes additional "free" area or space that facilitates the use of heatsinks 850 having a larger size relative to traditional heatsinks used in typical servers. Additionally, due to the improved thermal cooling characteristics of the chassis-less circuit board substrate 602, none of the processor heatsinks 850 include cooling fans attached thereto. That is, each of the heatsinks 850 is embodied as a fan-less heatsink. In some embodiments, the heat sinks 850 mounted atop the processors 820 may overlap with the heat sink attached to the communication circuit 830 in the direction of the airflow path 608 due to their increased size, as illustratively suggested by FIG. 9.

Figure 10:
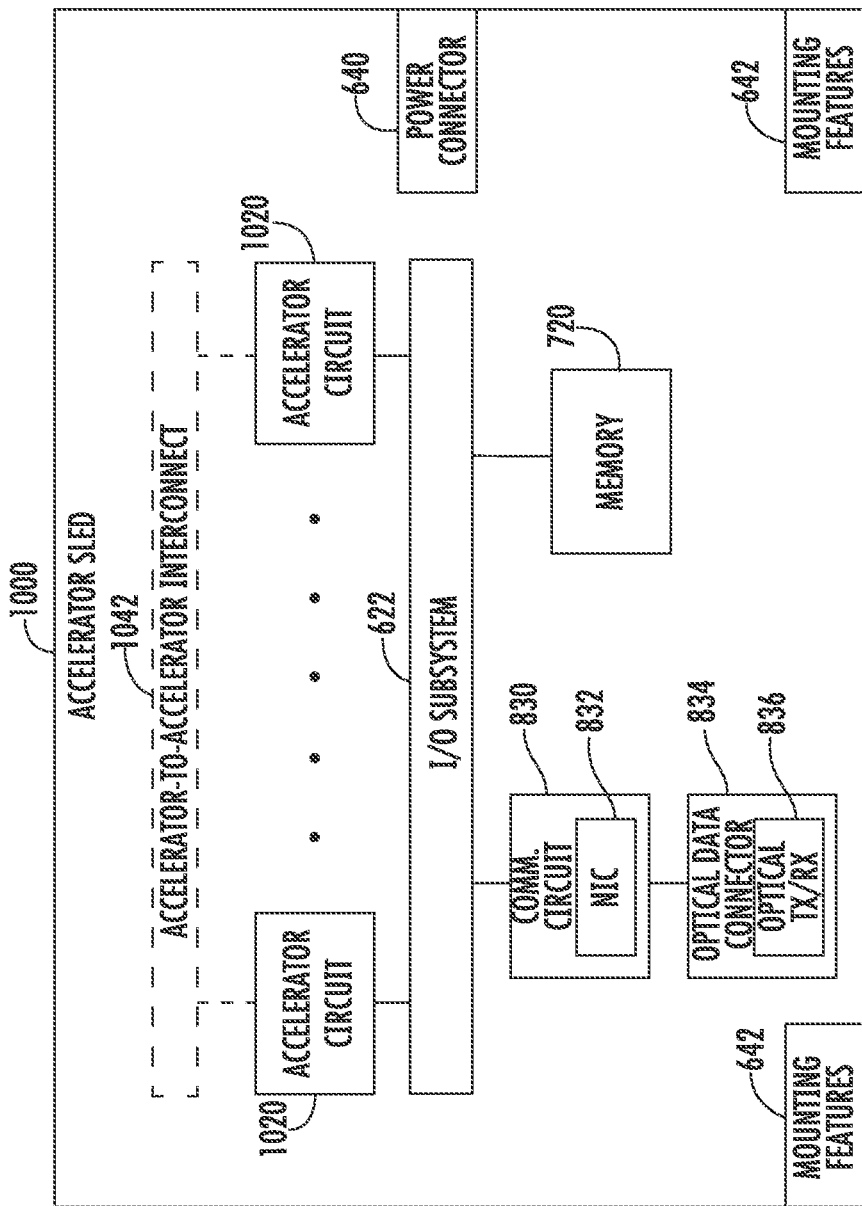
FIG. 10 is a simplified block diagram of at least one embodiment of an accelerator sled usable in a data center.

Referring now to FIG. 10, in some embodiments, the sled 400 may be embodied as an accelerator sled 1000. The accelerator sled 1000 is configured, to perform specialized compute tasks, such as machine learning, encryption, hashing, or other computational-intensive task. In some embodiments, for example, a compute sled 800 may offload tasks to the accelerator sled 1000 during operation. The accelerator sled 1000 includes various components similar to components of the sled 400 and/or compute sled 800, which have been identified in FIG. 10 using the same reference numbers. The description of such components provided above in regard to FIGS. 6, 7, and 8 apply to the corresponding components of the accelerator sled 1000 and is not repeated herein for clarity of the description of the accelerator sled 1000.

Figure 11:
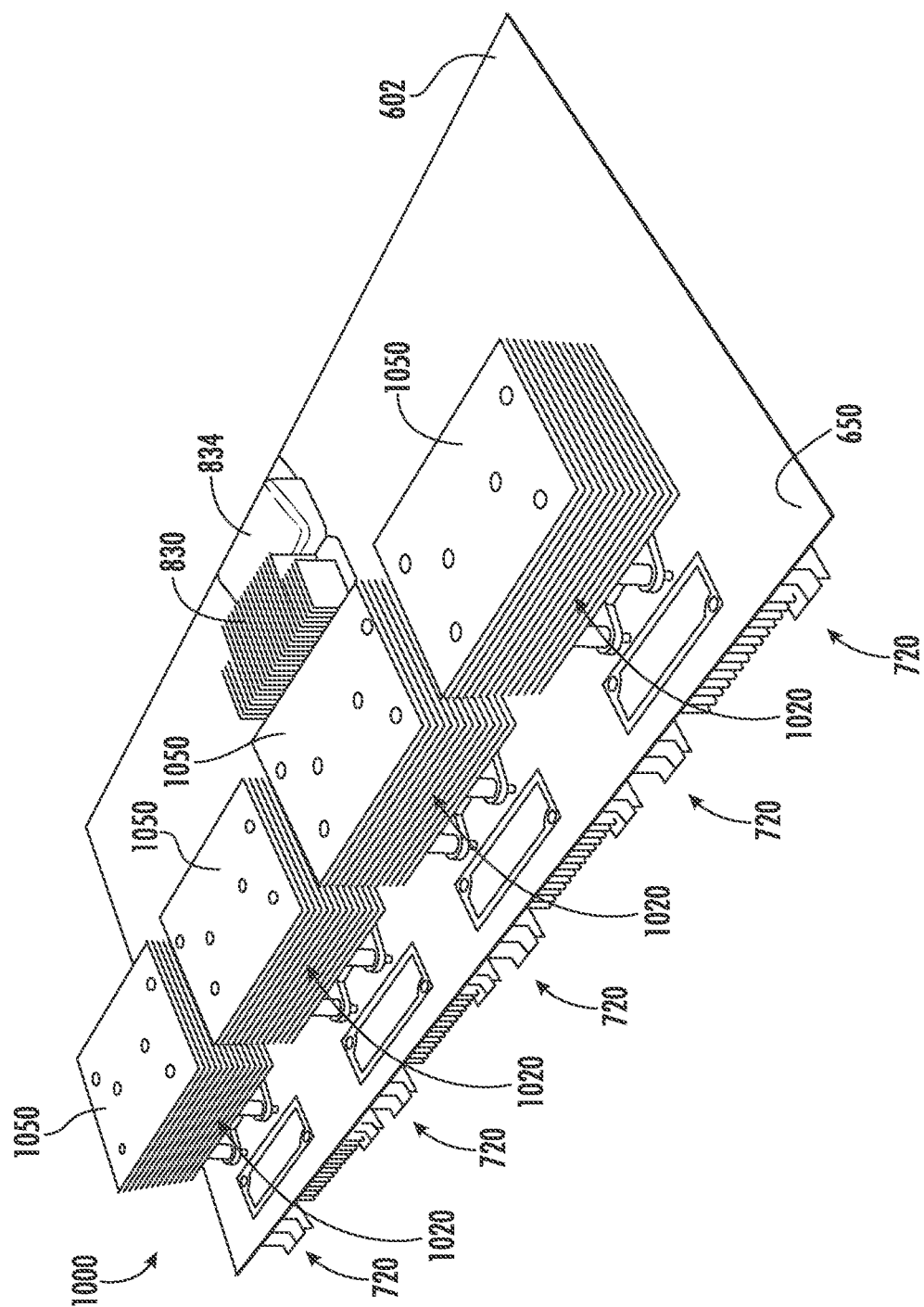
FIG. 11 is a top perspective view of at least one embodiment of an accelerator sled.

In the illustrative accelerator sled 1000, the physical resources 620 are embodied as accelerator circuits 1020. Although only two accelerator circuits 1020 are shown in FIG. 10, it should be appreciated that the accelerator sled 1000 may include additional accelerator circuits 1020 in other embodiments. For example, as shown in FIG. 11, the accelerator sled 1000 may include four accelerator circuits 1020 in some embodiments. The accelerator circuits 1020 may be embodied as any type of processor, co-processor, compute circuit, or other device capable of performing compute or processing operations. For example, the accelerator circuits 1020 may be embodied as, for example, central processing units, cores, field programmable gate arrays (FPGA), application-specific integrated circuits (ASICs), programmable control logic (PCL), security co-processors, graphics processing units (GPUs), neuromorphic processor units, quantum computers, machine learning circuits, or other specialized processors, controllers, devices, and/or circuits.

In some embodiments, the accelerator sled 1000 may also include an accelerator-to-accelerator interconnect 1042. Similar to the resource-to-resource interconnect 624 of the sled 600 discussed above, the accelerator-to-accelerator interconnect 1042 may be embodied as any type of communication interconnect capable of facilitating accelerator-to-accelerator communications. In the illustrative embodiment, the accelerator-to-accelerator interconnect 1042 is embodied as a high-speed point-to-point interconnect (e.g., faster than the I/O subsystem 622). For example, the accelerator-to-accelerator interconnect 1042 may be embodied as a QuickPath Interconnect (QPI), an UltraPath Interconnect (UPI), or other high-speed point-to-point interconnect dedicated to processor-to-processor communications. In some embodiments, the accelerator circuits 1020 may be daisy-chained with a primary accelerator circuit 1020 connected to the NIC 832 and memory 720 through the I/O subsystem 622 and a secondary accelerator circuit 1020 connected to the NIC 832 and memory 720 through a primary accelerator circuit 1020.

Referring now to FIG. 11, an illustrative embodiment of the accelerator sled 1000 is shown. As discussed above, the accelerator circuits 1020, communication circuit 830, and optical data connector 834 are mounted to the top side 650 of the chassis-less circuit board substrate 602. Again, the individual accelerator circuits 1020 and communication circuit 830 are mounted to the top side 650 of the chassis-less circuit board substrate 602 such that no two heat-producing, electrical components shadow each other as discussed above. The memory devices 720 of the accelerator sled 1000 are mounted to the bottom side 750 of the of the chassis-less circuit board substrate 602 as discussed above in regard to the sled 600. Although mounted to the bottom side 750, the memory devices 720 are communicatively coupled to the accelerator circuits 1020 located on the top side 650 via the I/O subsystem 622 (e.g., through vias). Further, each of the accelerator circuits 1020 may include a heatsink 1070 that is larger than a traditional heatsink used in a server. As discussed above with reference to the heatsinks 870, the heatsinks 1070 may be larger than traditional heatsinks because of the "free" area provided by the memory resources 720 being located on the bottom side 750 of the chassis-less circuit board substrate 602 rather than on the top side 650.

Figure 12:
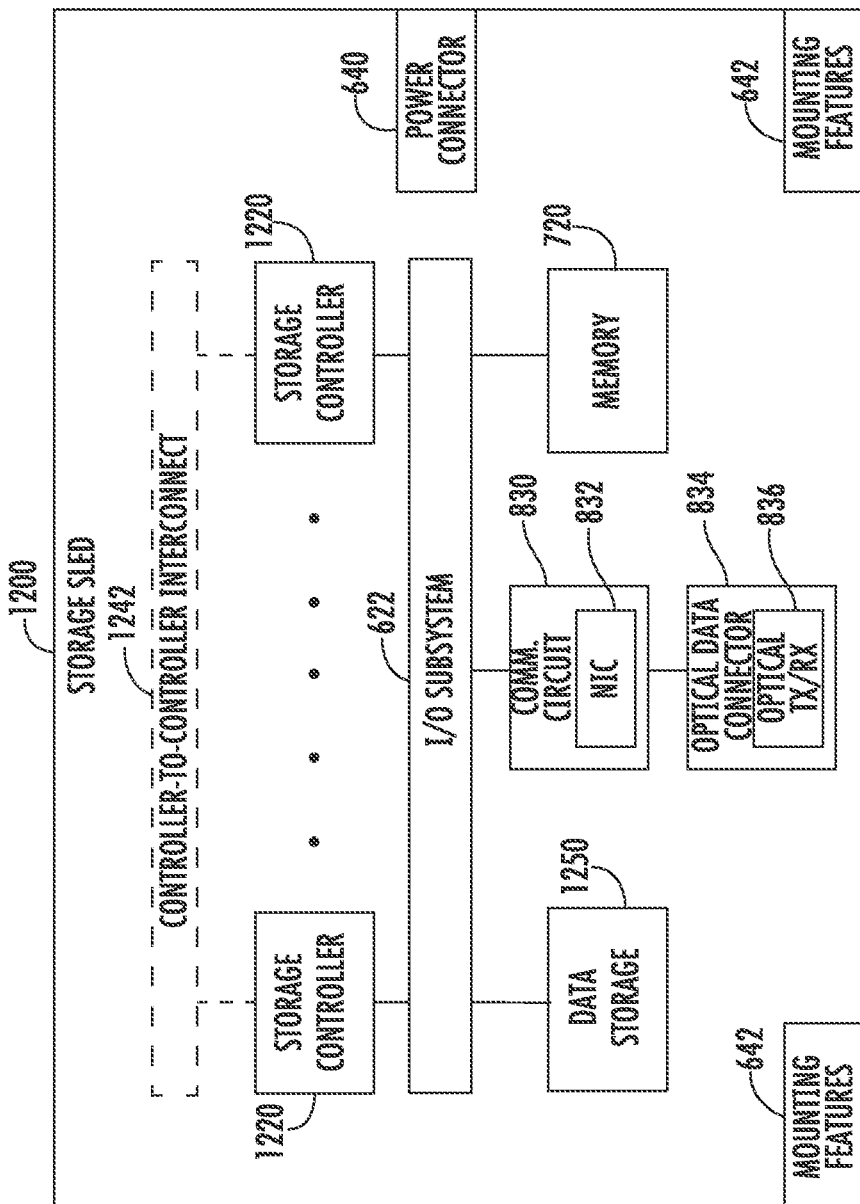
FIG. 12 is a simplified block diagram of at least one embodiment of a storage sled usable in a data center.

Referring now to FIG. 12, in some embodiments, the sled 400 may be embodied as a storage sled 1200. The storage sled 1200 is configured, to store data in a data storage 1250 local to the storage sled 1200. For example, during operation, a compute sled 800 or an accelerator sled 1000 may store and retrieve data from the data storage 1250 of the storage sled 1200. The storage sled 1200 includes various components similar to components of the sled 400 and/or the compute sled 800, which have been identified in FIG. 12 using the same reference numbers. The description of such components provided above with regard to FIGS. 6, 7, and 8 apply to the corresponding components of the storage sled 1200 and is not repeated herein for clarity of the description of the storage sled 1200.

In the illustrative storage sled 1200, the physical resources 620 are embodied as storage controllers 1220. Although only two storage controllers 1220 are shown in FIG. 12, it should be appreciated that the storage sled 1200 may include additional storage controllers 1220 in other embodiments. The storage controllers 1220 may be embodied as any type of processor, controller, or control circuit capable of controlling the storage and retrieval of data into the data storage 1250 based on requests received via the communication circuit 830. In the illustrative embodiment, the storage controllers 1220 are embodied as relatively low-power processors or controllers. For example, in some embodiments, the storage controllers 1220 may be configured to operate at a power rating of about 75 watts.

In some embodiments, the storage sled 1200 may also include a controller-to-controller interconnect 1242. Similar to the resource-to-resource interconnect 624 of the sled 400 discussed above, the controller-to-controller interconnect 1242 may be embodied as any type of communication interconnect capable of facilitating controller-to-controller communications. In the illustrative embodiment, the controller-to-controller interconnect 1242 is embodied as a high-speed point-to-point interconnect (e.g., faster than the I/O subsystem 622). For example, the controller-to-controller interconnect 1242 may be embodied as a QuickPath Interconnect (QPI), an UltraPath Interconnect (UPI), or other high-speed point-to-point interconnect dedicated to processor-to-processor communications.

Figure 13:
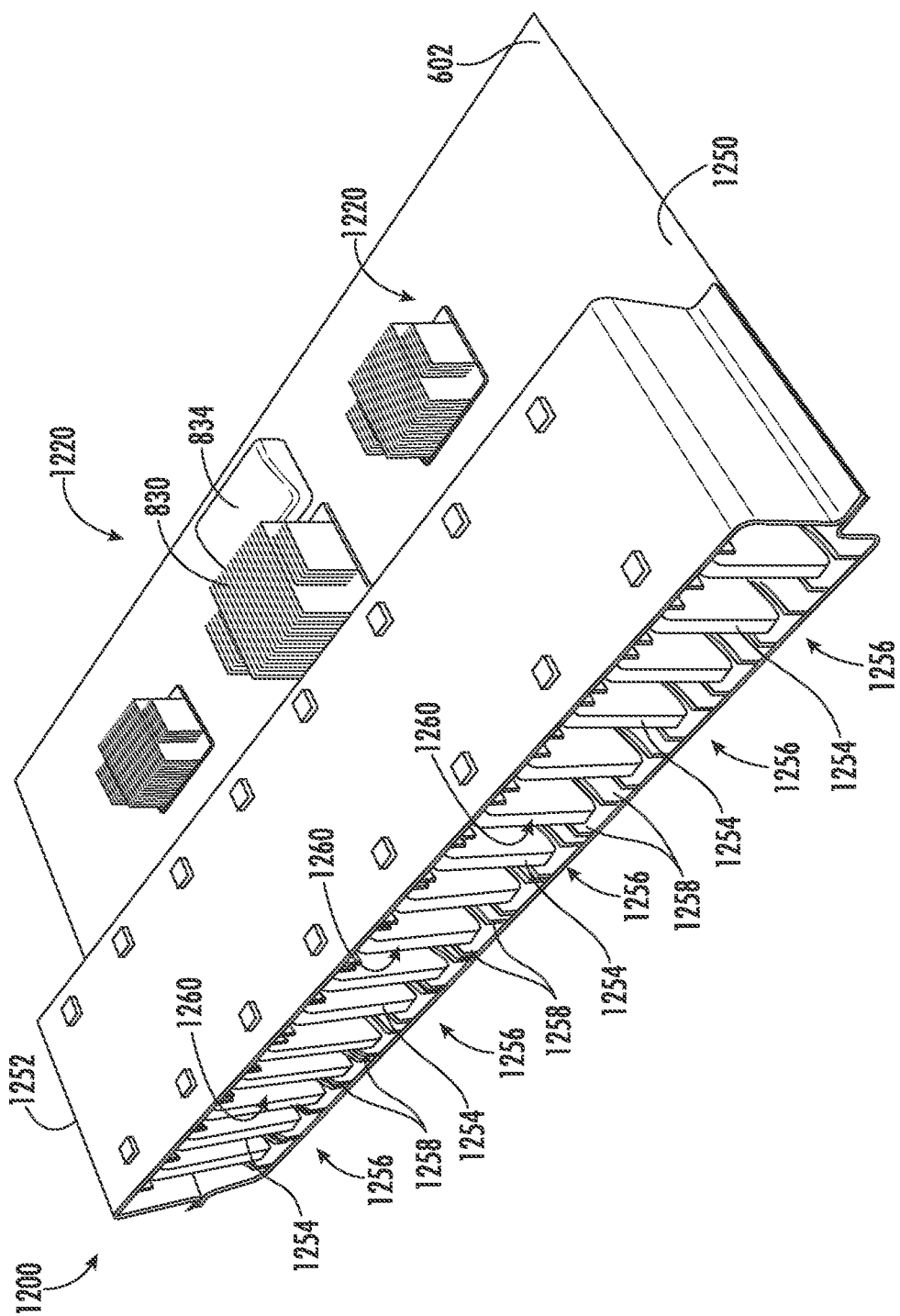
FIG. 13 is a top perspective view of at least one embodiment of a storage sled.

Referring now to FIG. 13, an illustrative embodiment of the storage sled 1200 is shown. In the illustrative embodiment, the data storage 1250 is embodied as, or otherwise includes, a storage cage 1252 configured to house one or more solid state drives (SSDs) 1254. To do so, the storage cage 1252 includes a number of mounting slots 1256, each of which is configured to receive a corresponding solid state drive 1254. Each of the mounting slots 1256 includes a number of drive guides 1258 that cooperate to define an access opening 1260 of the corresponding mounting slot 1256. The storage cage 1252 is secured to the chassis-less circuit board substrate 602 such that the access openings face away from (e.g., toward the front of) the chassis-less circuit board substrate 602. As such, solid state drives 1254 are accessible while the storage sled 1200 is mounted in a corresponding rack 204. For example, a solid state drive 1254 may be swapped out of a rack 240 (e.g., via a robot) while the storage sled 1200 remains mounted in the corresponding rack 240.

The storage cage 1252 illustratively includes sixteen mounting slots 1256 and is capable of mounting and storing sixteen solid state drives 1254. Of course, the storage cage 1252 may be configured to store additional or fewer solid state drives 1254 in other embodiments. Additionally, in the illustrative embodiment, the solid state drivers are mounted vertically in the storage cage 1252, but may be mounted in the storage cage 1252 in a different orientation in other embodiments. Each solid state drive 1254 may be embodied as any type of data storage device capable of storing long term data. To do so, the solid state drives 1254 may include volatile and non-volatile memory devices discussed above.

As shown in FIG. 13, the storage controllers 1220, the communication circuit 830, and the optical data connector 834 are illustratively mounted to the top side 650 of the chassis-less circuit board substrate 602. Again, as discussed above, any suitable attachment or mounting technology may be used to mount the electrical components of the storage sled 1200 to the chassis-less circuit board substrate 602 including, for example, sockets (e.g., a processor socket), holders, brackets, soldered connections, and/or other mounting or securing techniques.

As discussed above, the individual storage controllers 1220 and the communication circuit 830 are mounted to the top side 650 of the chassis-less circuit board substrate 602 such that no two heat-producing, electrical components shadow each other. For example, the storage controllers 1220 and the communication circuit 830 are mounted in corresponding locations on the top side 650 of the chassis-less circuit board substrate 602 such that no two of those electrical components are linearly in-line with each other along the direction of the airflow path 608.

The memory devices 720 of the storage sled 1200 are mounted to the bottom side 750 of the of the chassis-less circuit board substrate 602 as discussed above in regard to the sled 400. Although mounted to the bottom side 750, the memory devices 720 are communicatively coupled to the storage controllers 1220 located on the top side 650 via the I/O subsystem 622. Again, because the chassis-less circuit board substrate 602 is embodied as a double-sided circuit board, the memory devices 720 and the storage controllers 1220 may be communicatively coupled by one or more vias, connectors, or other mechanisms extending through the chassis-less circuit board substrate 602. Each of the storage controllers 1220 includes a heatsink 1270 secured thereto. As discussed above, due to the improved thermal cooling characteristics of the chassis-less circuit board substrate 602 of the storage sled 1200, none of the heatsinks 1270 include cooling fans attached thereto. That is, each of the heatsinks 1270 is embodied as a fan-less heatsink.

Figure 14:
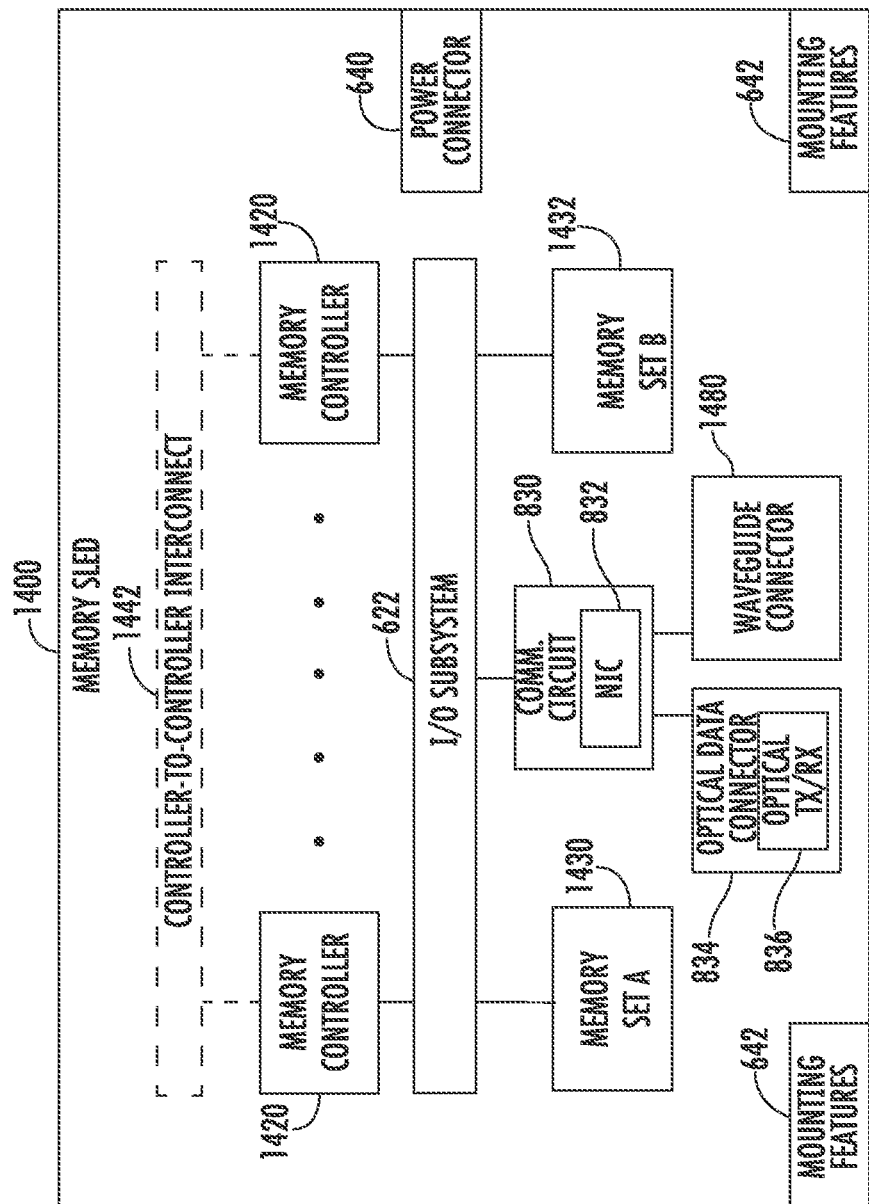
FIG. 14 is a simplified block diagram of at least one embodiment of a memory sled usable in a data center.

Referring now to FIG. 14, in some embodiments, the sled 400 may be embodied as a memory sled 1400. The storage sled 1400 is optimized, or otherwise configured, to provide other sleds 400 (e.g., compute sleds 800, accelerator sleds 1000, etc.) with access to a pool of memory (e.g., in two or more sets 1430, 1432 of memory devices 720) local to the memory sled 1200. For example, during operation, a compute sled 800 or an accelerator sled 1000 may remotely write to and/or read from one or more of the memory sets 1430, 1432 of the memory sled 1200 using a logical address space that maps to physical addresses in the memory sets 1430, 1432. The memory sled 1400 includes various components similar to components of the sled 400 and/or the compute sled 800, which have been identified in FIG. 14 using the same reference numbers. The description of such components provided above in regard to FIGS. 6, 7, and 8 apply to the corresponding components of the memory sled 1400 and is not repeated herein for clarity of the description of the memory sled 1400.

In the illustrative memory sled 1400, the physical resources 620 are embodied as memory controllers 1420. Although only two memory controllers 1420 are shown in FIG. 14, it should be appreciated that the memory sled 1400 may include additional memory controllers 1420 in other embodiments. The memory controllers 1420 may be embodied as any type of processor, controller, or control circuit capable of controlling the writing and reading of data into the memory sets 1430, 1432 based on requests received via the communication circuit 830. In the illustrative embodiment, each memory controller 1420 is connected to a corresponding memory set 1430, 1432 to write to and read from memory devices 720 within the corresponding memory set 1430, 1432 and enforce any permissions (e.g., read, write, etc.) associated with sled 400 that has sent a request to the memory sled 1400 to perform a memory access operation (e.g., read or write).

In some embodiments, the memory sled 1400 may also include a controller-to-controller interconnect 1442. Similar to the resource-to-resource interconnect 624 of the sled 400 discussed above, the controller-to-controller interconnect 1442 may be embodied as any type of communication interconnect capable of facilitating controller-to-controller communications. In the illustrative embodiment, the controller-to-controller interconnect 1442 is embodied as a high-speed point-to-point interconnect (e.g., faster than the I/O subsystem 622). For example, the controller-to-controller interconnect 1442 may be embodied as a QuickPath Interconnect (QPI), an UltraPath Interconnect (UPI), or other high-speed point-to-point interconnect dedicated to processor-to-processor communications. As such, in some embodiments, a memory controller 1420 may access, through the controller-to-controller interconnect 1442, memory that is within the memory set 1432 associated with another memory controller 1420. In some embodiments, a scalable memory controller is made of multiple smaller memory controllers, referred to herein as "chiplets", on a memory sled (e.g., the memory sled 1400). The chiplets may be interconnected (e.g., using EMIB (Embedded Multi-Die Interconnect Bridge)). The combined chiplet memory controller may scale up to a relatively large number of memory controllers and I/O ports, (e.g., up to 16 memory channels). In some embodiments, the memory controllers 1420 may implement a memory interleave (e.g., one memory address is mapped to the memory set 1430, the next memory address is mapped to the memory set 1432, and the third address is mapped to the memory set 1430, etc.). The interleaving may be managed within the memory controllers 1420, or from CPU sockets (e.g., of the compute sled 800) across network links to the memory sets 1430, 1432, and may improve the latency associated with performing memory access operations as compared to accessing contiguous memory addresses from the same memory device.

Further, in some embodiments, the memory sled 1400 may be connected to one or more other sleds 400 (e.g., in the same rack 240 or an adjacent rack 240) through a waveguide, using the waveguide connector 1480. In the illustrative embodiment, the waveguides are 64 millimeter waveguides that provide 16 Rx (e.g., receive) lanes and 16 Tx (e.g., transmit) lanes. Each lane, in the illustrative embodiment, is either 16 GHz or 32 GHz. In other embodiments, the frequencies may be different. Using a waveguide may provide high throughput access to the memory pool (e.g., the memory sets 1430, 1432) to another sled (e.g., a sled 400 in the same rack 240 or an adjacent rack 240 as the memory sled 1400) without adding to the load on the optical data connector 834.

Figure 15:
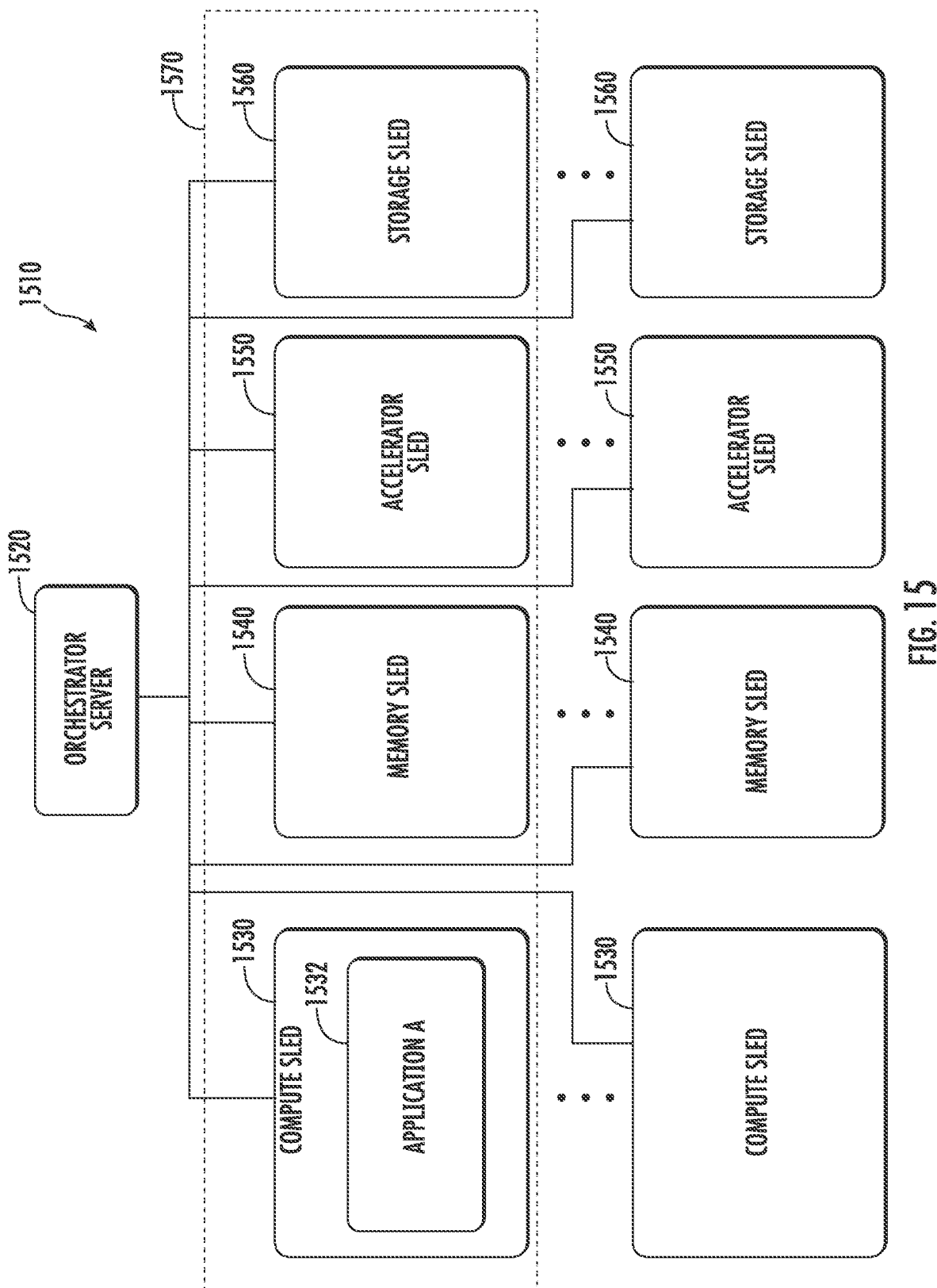
FIG. 15 depicts a system for executing one or more workloads.

Referring now to FIG. 15, a system for executing one or more workloads (e.g., applications) may be implemented in accordance with the data center 100. In the illustrative embodiment, the system 1510 includes an orchestrator server 1520, which may be embodied as a managed node comprising a compute device (e.g., a processor 820 on a compute sled 800) executing management software (e.g., a cloud operating environment, such as OpenStack) that is communicatively coupled to multiple sleds 400 including a large number of compute sleds 1530 (e.g., each similar to the compute sled 800), memory sleds 1540 (e.g., each similar to the memory sled 1400), accelerator sleds 1550 (e.g., each similar to the memory sled 1000), and storage sleds 1560 (e.g., each similar to the storage sled 1200). One or more of the sleds 1530, 1540, 1550, 1560 may be grouped into a managed node 1570, such as by the orchestrator server 1520, to collectively perform a workload (e.g., an application 1532 executed in a virtual machine or in a container). The managed node 1570 may be embodied as an assembly of physical resources 620, such as processors 820, memory resources 720, accelerator circuits 1020, or data storage 1250, from the same or different sleds 400. Further, the managed node may be established, defined, or "spun up" by the orchestrator server 1520 at the time a workload is to be assigned to the managed node or at any other time, and may exist regardless of whether any workloads are presently assigned to the managed node. In the illustrative embodiment, the orchestrator server 1520 may selectively allocate and/or deallocate physical resources 620 from the sleds 400 and/or add or remove one or more sleds 400 from the managed node 1570 as a function of quality of service (QoS) targets (e.g., a target throughput, a target latency, a target number instructions per second, etc.) associated with a service level agreement for the workload (e.g., the application 1532). In doing so, the orchestrator server 1520 may receive telemetry data indicative of performance conditions (e.g., throughput, latency, instructions per second, etc.) in each sled 400 of the managed node 1570 and compare the telemetry data to the quality of service targets to determine whether the quality of service targets are being satisfied. The orchestrator server 1520 may additionally determine whether one or more physical resources may be deallocated from the managed node 1570 while still satisfying the QoS targets, thereby freeing up those physical resources for use in another managed node (e.g., to execute a different workload). Alternatively, if the QoS targets are not presently satisfied, the orchestrator server 1520 may determine to dynamically allocate additional physical resources to assist in the execution of the workload (e.g., the application 1532) while the workload is executing. Similarly, the orchestrator server 1520 may determine to dynamically deallocate physical resources from a managed node if the orchestrator server 1520 determines that deallocating the physical resource would result in QoS targets still being met.

Additionally, in some embodiments, the orchestrator server 1520 may identify trends in the resource utilization of the workload (e.g., the application 1532), such as by identifying phases of execution (e.g., time periods in which different operations, each having different resource utilizations characteristics, are performed) of the workload (e.g., the application 1532) and pre-emptively identifying available resources in the data center 100 and allocating them to the managed node 1570 (e.g., within a predefined time period of the associated phase beginning). In some embodiments, the orchestrator server 1520 may model performance based on various latencies and a distribution scheme to place workloads among compute sleds and other resources (e.g., accelerator sleds, memory sleds, storage sleds) in the data center 100. For example, the orchestrator server 1520 may utilize a model that accounts for the performance of resources on the sleds 400 (e.g., FPGA performance, memory access latency, etc.) and the performance (e.g., congestion, latency, bandwidth) of the path through the network to the resource (e.g., FPGA). As such, the orchestrator server 1520 may determine which resource(s) should be used with which workloads based on the total latency associated with each potential resource available in the data center 100 (e.g., the latency associated with the performance of the resource itself in addition to the latency associated with the path through the network between the compute sled executing the workload and the sled 400 on which the resource is located).

In some embodiments, the orchestrator server 1520 may generate a map of heat generation in the data center 100 using telemetry data (e.g., temperatures, fan speeds, etc.) reported from the sleds 400 and allocate resources to managed nodes as a function of the map of heat generation and predicted heat generation associated with different workloads, to maintain a target temperature and heat distribution in the data center 100. Additionally or alternatively, in some embodiments, the orchestrator server 1520 may organize received telemetry data into a hierarchical model that is indicative of a relationship between the managed nodes (e.g., a spatial relationship such as the physical locations of the resources of the managed nodes within the data center 100 and/or a functional relationship, such as groupings of the managed nodes by the customers the managed nodes provide services for, the types of functions typically performed by the managed nodes, managed nodes that typically share or exchange workloads among each other, etc.). Based on differences in the physical locations and resources in the managed nodes, a given workload may exhibit different resource utilizations (e.g., cause a different internal temperature, use a different percentage of processor or memory capacity) across the resources of different managed nodes. The orchestrator server 1520 may determine the differences based on the telemetry data stored in the hierarchical model and factor the differences into a prediction of future resource utilization of a workload if the workload is reassigned from one managed node to another managed node, to accurately balance resource utilization in the data center 100. In some embodiments, the orchestrator server 1520 may identify patterns in resource utilization phases of the workloads and use the patterns to predict future resource utilization of the workloads.

To reduce the computational load on the orchestrator server 1520 and the data transfer load on the network, in some embodiments, the orchestrator server 1520 may send self-test information to the sleds 400 to enable each sled 400 to locally (e.g., on the sled 400) determine whether telemetry data generated by the sled 400 satisfies one or more conditions (e.g., an available capacity that satisfies a predefined threshold, a temperature that satisfies a predefined threshold, etc.). Each sled 400 may then report back a simplified result (e.g., yes or no) to the orchestrator server 1520, which the orchestrator server 1520 may utilize in determining the allocation of resources to managed nodes.

Network Interface Controller with Eviction Cache

Due to the dynamic nature of data accesses, memory blocks (e.g., a contiguous sequence of data) can change between hot and cold states over time. Data can be considered "hot" if the data is frequently accessed (e.g., "read") or "cold" if the data is infrequently or never accessed. As a result, system software may look at replacing blocks that are currently cold but in local memory with blocks that are currently hot but stored in a remote memory node pool. In doing so, the cold block from local memory can be written to a remote memory node pool and the local memory is freed to hold other blocks. However, the identification scheme to identify hot or cold data is unlikely to be perfect, it may identify some block of data as cold but the block is actually going to be accessed again shortly (e.g., "hot").

Various embodiments provide for configuring a network interface controller to also store data, that is copied from a local memory device to a remote memory pool, into a local victim cache or memory device. In a case where the data is inadvertently evicted from local memory or is to be accessed sooner than expected, the data can be fetched from the victim cache to reduce latency (e.g., time taken to retrieve data and make the data available to process). Various embodiments can reduce average latency time to data access while allowing use of imperfect data eviction identification schemes that attempt to free space in a local memory or cache.

Figure 16:
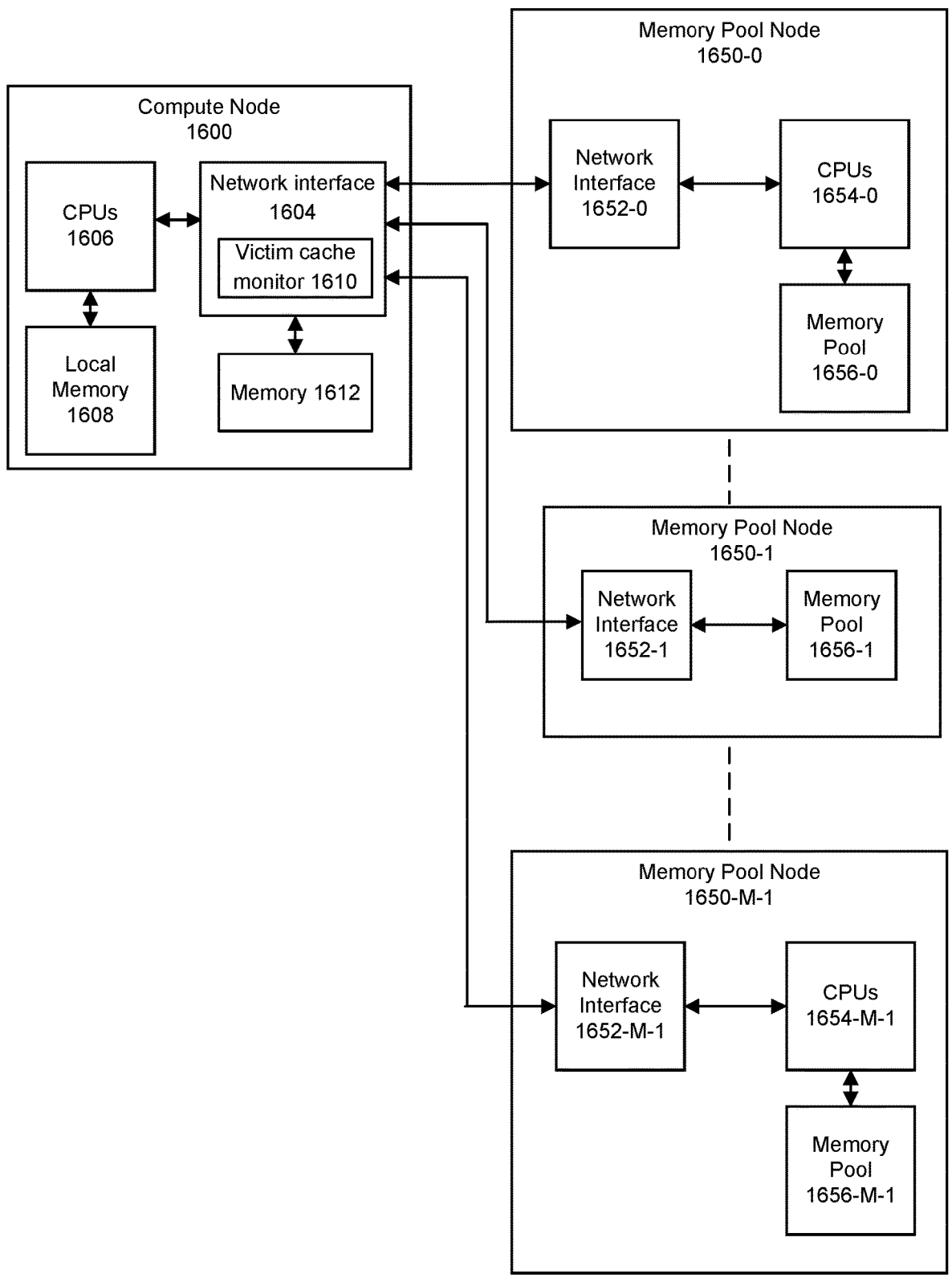
FIG. 16 depicts an example system.

FIG. 16 depicts an example of memory pools accessible by multiple hosts. A system topology can include N compute nodes connected to M memory nodes, where N and M are integers and can be the same or different values. In this example, N=1 and reference is made to compute node 1600, which can apply to any other compute node. Memory nodes 1650-0 to 1650-M−1 can provide some of the memory used by any of the N compute nodes and a remainder of a compute node's memory needs may be met by its local memory 1608 or memory 1612 (e.g., memory accessible through a bus or device interface (e.g., DDR, CXL, PCIe)). System software (e.g., data center orchestrator) can manage how the memory in memory nodes 1650-0 to 1650-M−1 is partitioned between or assigned to the N compute nodes.

Compute node 1600 can include a network interface 1604, compute resources (e.g., CPUs 1606 or accelerators), and memory resources (e.g., local memory 1608, memory 1612, storage, or cache). For example, compute node 1600 can execute workloads or applications. For example, compute node 1600 can be implemented as a server, rack of servers, computing platform, or others. In some examples, compute node 1600 can include one or more of: a core, graphics processing unit (GPU), field programmable gate array (FPGA), or application specific integrated circuit (ASIC). In some examples, a core can be sold or designed by Intel®, ARM®, AMD®, Qualcomm®, IBM®, Texas Instruments®, among others. Any processor can execute an operating system, driver, applications, and/or a virtualized execution environment (VEE) (e.g., virtual machine or container). In some examples, an operating system (OS) can be Linux®, Windows®, FreeBSD®, Android®, MacOS®, iOS®, or any other operating system.

Compute node 1600 can be coupled to memory pool node 1650 using a network or fabric. In some examples, memory can be remote from a compute node if a packet is formed to transmit a memory access request and the packet traverses one or more switches or routers and an endpoint receiver de-encapsulates the memory access request in the received packet. Although this example shows merely one compute node coupled to multiple memory pool nodes, multiple compute nodes can be coupled to multiple memory pool nodes.

Any of memory pools 1650-0 to 1650-M-1 can include a network interface 1652, CPUs 1654, memory pool 1656 including any type of cache, volatile memory, non-volatile memory. Some embodiments of memory pools 1650-0 to 1650-M-1 can include accelerator devices, GPUs, or any component in any compute node 1600. Note that in some examples, any of memory pools 1650-0 to 1650-M-1 could also utilize a DMA engine and network interface so that data transfers from a memory pool to another memory pool, data transfers within or among one or more memory devices of a memory pool, or from a memory pool to a compute node could be initiated using a DMA transfer request. Any memory pool node 1650 can include a network or fabric interface, compute resources (e.g., CPUs or accelerators), and memory resources (e.g., memory, storage, or cache).

In some examples of a memory pool node, a CPU 1654 can be part of a SoC and network interface 1652 can access a memory device using an uncore without involving the SoC or CPU 1654. In some examples of a memory pool node, network interface 1652 can interact with a memory controller to perform read or write memory devices in a memory pool 1656.

Compute node 1600 or any memory pool node 1650-0 to 1650-M-1 can execute an application, virtualized execution environment (VEE) (e.g., virtual machine or container), operating system (OS) or other software executed by CPUs 1606 or other device such as an accelerator device that issues a memory access request (e.g., read, write, read-modify-write). In some examples, network interface 1604 of compute node 1600 can determine whether a destination address associated with the memory access request corresponds to an address in local memory 1608 or any memory device in memory pools 1650-0 to 1650-M-1. For a memory write operation to any of memory pools 1650-0 to 1650-M-1, network interface 1604 can utilize victim cache monitor 1610 to determine whether to also copy data subject to the memory write operation to a memory pool to memory 1612. In some examples, network interface 1604 can be implemented as a rack switch (e.g., top of rack (TOR) switch).

In some examples, memory 1612 can be accessed by CPUs 1606, victim cache monitor 1610, and/or network interface 1604 using a device interface (e.g., PCIe) or memory interface (e.g., DDR, CXL). In some examples, memory 1612 are coupled to CPUs 1606, victim cache monitor 1610, and/or network interface 1604 using conductive leads of one or more circuit boards. In some examples, memory 1612 are part of a same system on chip (SoC) as CPUs 1606, victim cache monitor 1610, and/or network interface 1604.

For example, a processor-executed operating system (OS) can determine that content in a page of addressable memory has not been accessed from local memory within an amount of time by any copy operation of content in the page to a cache or a read operation and determine that the page of content is not likely to be accessed within an amount of time, and the OS can cause content in the page to be evicted from local memory 1608 to a memory pool node to free space in memory 1608 for other uses. Such memory page can be considered "cold." A page can be 4096 bytes, but larger or smaller sizes or regions of memory can be monitored to determine whether to evict the content to a memory pool. Example memory eviction schemes include least recently used (LRU), Time aware Least Recently Used (TLRU) (e.g., Bilal, Muhammad; et al. (2017). "Time Aware Least Recent Used (TLRU) Cache Management Policy in ICN". IEEE 16th International Conference on Advanced Communication Technology (ICACT): 528-532), set associativity, or others.

System software such as an OS could manage content of local memory 1608 so that local memory 1608 stores content that is frequently accessed and content in remote memory (e.g., in a memory pool) are infrequently accessed. System software could implement a hot/cold policy or heuristic that identifies which pages of the working set are "hot" (to be frequently accessed) or "cold" (to be infrequently accessed). Hardware, software, or some combination of the two may implement this algorithm.

In some examples, the decision to evict content from local memory 1608 to a memory pool may be faulty as an application or device can request access to the content. In some cases, compute node 1600 can request the data from the memory pool to service a page fault (e.g., requested data is not available in local memory 1608) and such request can introduce latency between when the data is requested to be accessed and when the data is available to process. Various embodiments of victim cache monitor 1610 can predict that an eviction of data (e.g., a copy operation of data in local memory 1608 to a memory pool node) is faulty and will likely be followed by a data read operation for such data and victim cache monitor 1610 can cause such data to be stored in memory 1612. Such data can also be stored in a memory node in addition to memory 1612 or just stored in memory 1612. Storing the data in a memory node can provide redundancy and back-up for the data stored in memory 1612 or provide access to the data by another requester (subject to coherency checks). For example, one or more other network interfaces or CPUs can issue "snoop" requests to request and receive a most up-to-date (e.g., last modified) copy of data that is stored in memory 1612. Accordingly, instead of incurring latency from requesting the data from a memory node over a fabric (e.g., packet formation, packet decomposition, network traversal between compute node 1600 and a memory pool node, and back), data can be accessed from memory 1612 using a high speed local interface (e.g., PCIe, CXL, DDR, and so forth).

Network interface 1604 can be configured by a driver, operating system, or register to utilize victim cache monitor

1610 to identify data evicted from local memory 1608 that is likely to be accessed within a time period.

Memory 1612 can be utilized to store data that is evicted from local memory 1608 to free its memory space in local memory 1608 to store other data where the evicted data is sent to a memory pool node. Victim cache monitor 1610 can predict whether the data will be requested to be accessed by compute node 1600 within a time period after the eviction and determine if there is space to store the evicted data in memory 1612. Memory 1612 can include one or more of: one or more registers, one or more cache devices (e.g., L1, L2, L3, LLC), volatile memory device, non-volatile memory device, or persistent memory device. For example, memory 1612 can include static random access memory (SRAM) memory technology or memory technology consistent with high bandwidth memory (HBM), or double data rate (DDR), among others. In some examples, memory 1612 is a region of memory in local memory 1608 and not a separate memory device. Memory 1612 can be connected to network interface 1604 using a high speed interface (e.g., DDR, CXL, Peripheral Component Interconnect express (PCIe)).

Memory 1612 can be used as a victim cache for a page-granular memory pooling system. In this usage, pages that are moving out of the local memory are cached in memory 1612 in case they are requested shortly after being evicted.

Contents of memory 1612 could be managed in any number of manners. For example, memory 1612 could be managed as a cache with appropriate pre-fetching, victimization, eviction, and other cache content policies. Contents stored into memory 1612 could be managed by network interface 1604 or victim cache monitor 1610. For example, victim cache monitor 1610 could determine what data associated with a memory eviction to write to memory 1612. For example, victim cache monitor 1610 follow any heuristic such as: always cache writes, cache a write to page P if there was a read from page P within the last N seconds, utilize a machine learning (ML) algorithm that predicts likelihood page P will be read back within next N seconds, and so forth.

Contents stored into memory 1612 could be managed by software (e.g., OS) that can specify evicted data is to be cached always or permit victim cache monitor 1610 to determine whether to store the evicted data into memory 1612. For example, network interface 1604 can receive a hint from an OS that indicates a level of confidence (e.g., high, medium, or low) that the evicted data from local memory 1608 is not likely to be accessed again within a period of time. For example, a machine learning (ML) technique can be used to track access patterns of content of memory address and predict that data will be accessed again.

In some examples, memory 1612 could be managed as a tier of memory that can be directly mapped into the system and managed by system software (e.g., OS, hypervisor, orchestrator). Memory 1612 could be managed as a prefetch buffer driven by policies running in network interface 1604 (e.g., smartNIC) or local CPUs.

Victim cache monitor 1610 could manage memory 1612 using set associativity and map an address in local memory 1608 to a region of memory 1612. In some examples, victim cache monitor 1610 could evict content from memory 1612 (which is also stored to a memory pool node) using cache management schemes such as least recently used (LRU), or other schemes described herein. As such, content evicted content from memory 1612 need not be stored to another memory device.

In some examples, network interface 1604 can save a most recently integer N pages of data evicted from local memory 1608 to a memory node into memory 1612. Other schemes can be used.

In some examples, memory 1612 is not visible to an OS or CPU as an available memory space to directly access (e.g., read from or write to). For example, network interface 1604 can access memory 1612 as a result of a page fault that causes the page fault handler to submit a memory access request to network interface 1604 with a source address that is not stored in local memory 1608 but instead resides in remote memory node memory 1656. In some examples, victim cache monitor 1610 can track source addresses in one or more memory pool nodes that instead correspond to addresses in memory 1612. In cases where a memory access request for a source address in a memory pool node corresponds to data stored in memory 1612, victim cache monitor 1610 can cause data from memory 1612 to be provided to the requester as though the data were received from the memory node pool. In some examples, if data is requested from memory pool node 1650 but is stored in memory 1612, network interface 1604 can provide a pointer to an address in memory 1612 or copy the data to local memory 1608 or a cache for processing.

For example, an example tracker used by victim cache monitor 1610 to track which source addresses in memory pool nodes correspond to addresses in memory 1612 can be as shown in Table 1. Other manners of identifying data accessible from memory 1612 can be used.

TABLE 1

| Source address in memory node pool | Memory node pool identifier | Address in memory 1612 |
| --- | --- | --- |
| 0x40008000 | IP address 000.000.001 | None; send memory access request to memory pool node identifier |
| 0x40008010 | IP address 000.000.001 | 0x70008100 |

In some examples, victim cache monitor 1610 can elect to allow data to be copied solely to a memory pool node and not also store the data into memory 1612. For example, if available space in memory 1612 is insufficient, victim cache monitor 1610 can elect to allow data to be copied solely to a memory pool node and not also store the data into memory 1612.

In some examples, victim cache monitor 1610 can cause pre-fetching of data into memory 1612. Pre-fetching of data can include requesting a copy of data prior to an actual request to copy the data from an application, device, or processor. For example, if it victim cache monitor 1610 determines (via heuristics, ML, etc.) that a write of page A is often followed by a read from page B and page B is currently in remote memory, victim cache monitor 1610 could initiate a pre-fetch of page B from remote memory pool node to copy page B to compute node 1650 or a memory device that would provide page B faster than the memory pool node that stores the page B.

Various embodiments of network interface 1604 can be accessed by a requester using a packet transmission request by specifying a memory buffer with memory content to copy to a remote memory pool node. In response, network interface 1604 can form one or more packets and transmit the one or more packets to the memory pool node.

In some examples, network interface 1604 could also utilize a DMA engine so that data transfers from local memory 1608 to a memory pool could be initiated by a requester using a DMA transfer request. Various embodiments of network interface 1604 can be accessed by a requester using DMA semantics where DMA data transfer request is specified using the following format:

Data_transfer(source address, destination address, length).

In some examples, a DMA command can zero-fill a region (e.g., write all zeros to a region of memory addresses) or a DMA command could cause compression of data in a region. For example, a DMA command could include fields such as [operation, address, parameter], where an operation could include zero fill or compression.

Network interface 1604 could inspect address information (a physical or virtual address, address space identifier, etc.) in the DMA data transfer request or DMA command and use that information to determine where the source or destination data is located (in local memory or in remote pool memory of some memory pool attached to the overall system). When the information indicates source or destination corresponds to a remote memory pool node, network interface 1604 can transmit messages to the remote memory pool to facilitate a read from a memory pool node or write to a memory pool node.

DMA is a technology that allows an input/output (I/O) device to bypass a central processing unit (CPU) or core, and to send or receive data directly to or from a system memory. Because DMA allows the CPU or core to not manage a copy operation when sending or receiving data to or from the system memory, the CPU or core can be available to perform other operations. Without DMA, when the CPU or core is using programmed input/output, the CPU or core is typically occupied for the entire duration of a read or write operation and is unavailable to perform other work. With DMA, the CPU or core can, for example, initiate a data transfer, and then perform other operations while the data transfer is in progress. The CPU or core can receive an interrupt from a DMA controller when the data transfer is finished.

Some examples of DMA engine 1602 provide data mover and transformation operations. For example, DMA engine 1602 can validate CRC or checksum values in connection with storage and networking applications. For example, DMA engine 1602 can perform memory compare and delta generation or merge to support VM or container migration, VM or container check-pointing (e.g., to revert a VM or container to a previous state) and software managed memory deduplication usages.

Some examples of DMA engine 1602 are part of an Infrastructure Processing Unit (IPU). An IPU can include a SmartNIC with one or more programmable or fixed function processors to perform offload of operations that could have been performed by a CPU. The IPU can include one or more memory devices. In some examples, the IPU can perform virtual switch operations, manage storage transactions (e.g., compression, cryptography, virtualization), and manage operations performed on other IPUs, servers, or devices.

High speed connections can be used to couple a compute node 1600 and memory nodes 1650-0 to 1650-M−1 such as one or more of: Ethernet (IEEE 802.3), remote direct memory access (RDMA), InfiniBand, Internet Wide Area RDMA Protocol (iWARP), Transmission Control Protocol (TCP), User Datagram Protocol (UDP), quick UDP Internet Connections (QUIC), RDMA over Converged Ethernet (RoCE), Peripheral Component Interconnect express (PCIe), Intel QuickPath Interconnect (QPI), Intel Ultra Path Interconnect (UPI), Intel On-Chip System Fabric (IOSF), Omnipath, Compute Express Link (CXL), HyperTransport, high-speed fabric, NVLink, Advanced Microcontroller Bus Architecture (AMBA) interconnect, OpenCAPI, Gen-Z, Cache Coherent Interconnect for Accelerators (CCIX), Infinity Fabric (IF), 3GPP Long Term Evolution (LTE) (4G), 3GPP 5G, and variations thereof. In some examples, data can be copied or stored to virtualized storage nodes using protocols such as Non-Volatile Memory Express (NVMe) or NVMe over fabrics (NVMe-oF) (or iSCSI storage command generation). For example, NVMe-oF is described at least in NVM Express, Inc., "NVM Express Over Fabrics," Revision 1.0, Jun. 5, 2016, and specifications referenced therein and variations and revisions thereof.

Figure 17A:
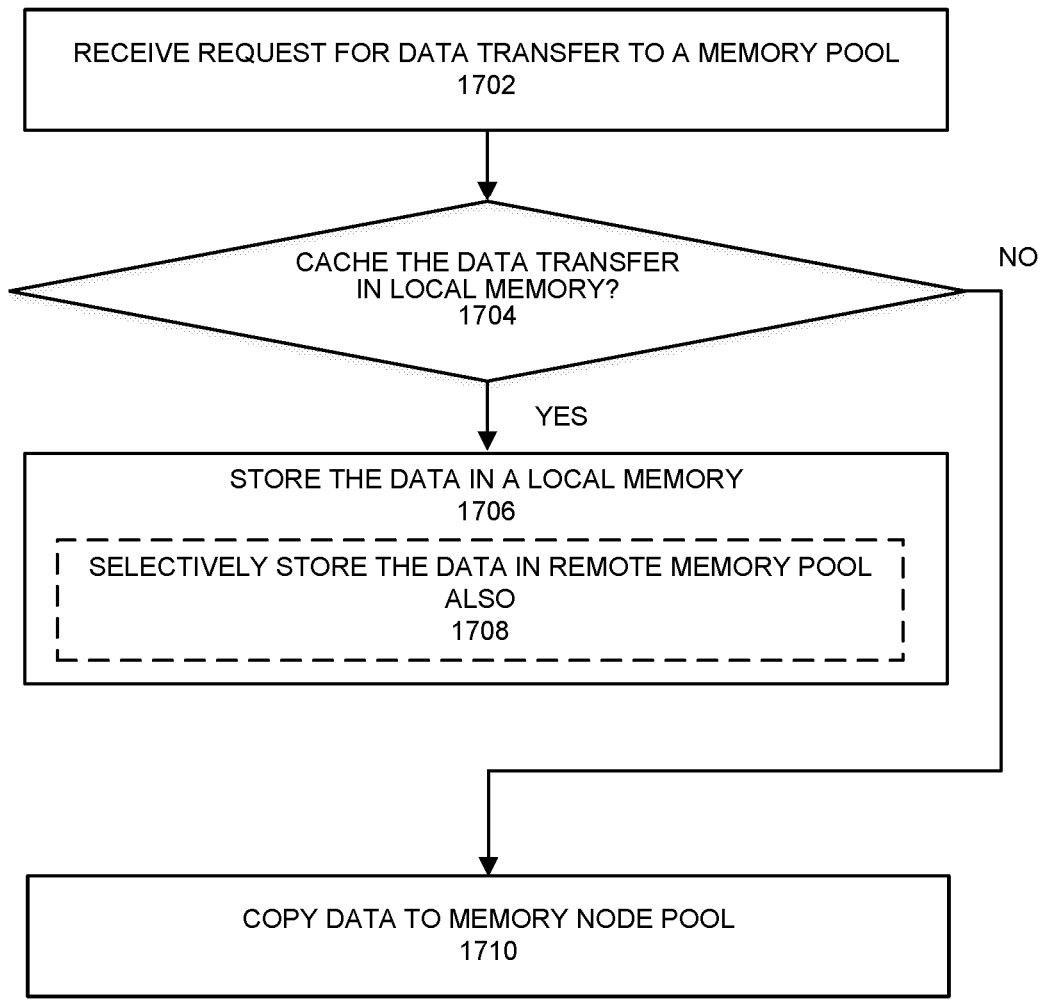
FIG. 17A depicts an example process.

FIG. 17A depicts an example process. The process can be performed by a network interface or fabric interface in some examples. At 1702, a request for a data transfer from local memory to a memory pool can take place. In some examples, software can initiate a direct memory access (DMA) request or packet send request to cause a copy of data from a source address to a destination address. System software may cause movement of data at some granularity (e.g., page-sized blocks, cache lines, or other sizes) from local memory to a memory pool node.

At 1704, a network interface can determine whether to store the data into a local memory (e.g., cache). For example, the network interface can determine to store some number of most recently evicted pages or cache lines (or other sizes of data) into the cache. In some examples, the network interface can decide to store data in the cache if there is space available in the cache. In some examples, the network interface can decide to store data that is subject to a hint that the eviction is low confidence as subsequent near term access to the evicted data is likely. If the network interface decides that the data is to be stored in the cache, the process proceeds to 1706 where the network interface can copy the data evicted from the local memory to the cache. In some cases, the data can be stored in the cache and a remote memory pool. Storage of the data into both the cache and a remote memory pool can occur to provide a back-up for the data. If the data is stored in both the cache and a remote memory pool, data coherence can be maintained between the two copies of the data so that the latest and most recent version of the data is provided for a read operation.

If the network interface decides that the data is to be copied to a remote memory node, the process proceeds to 1710, where the network interface can cause the data to be stored in a memory node pool.

Figure 17B:
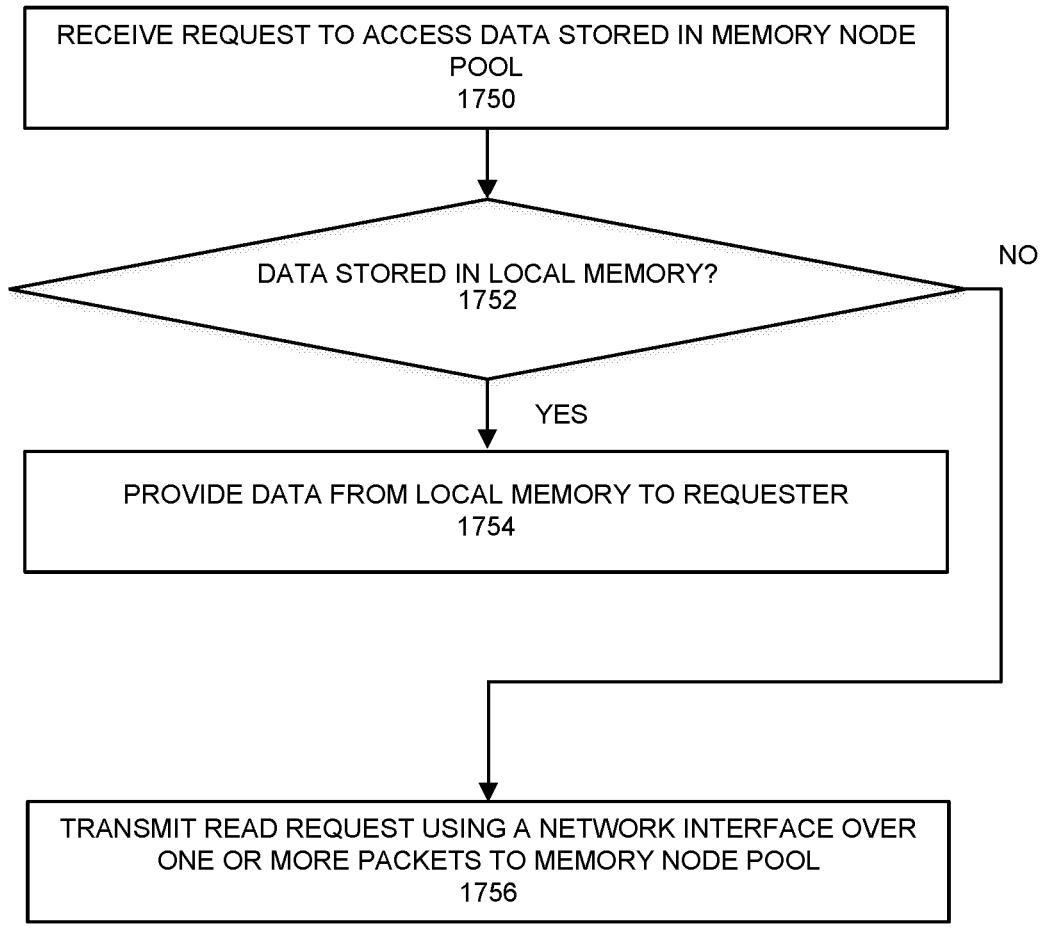
FIG. 17B depicts an example process.

FIG. 17B depicts an example process. The process can be performed by a network interface or a fabric interface. At 1750, a request is received at a network interface to access data stored in a memory pool node. At 1752, a determination is made as to whether the data is stored in a memory (e.g., cache) accessible to the network interface. For example, the network interface can access a look-up-table or data that indicates whether an address provided for a data access request corresponds to an address in a memory pool node or the cache. If the data is stored in the cache, the process proceeds to 1754, where the network interface provides the data from the cache to a destination buffer. In some examples, a pointer can be provided to data in the cache to a requester of the data. In some cases, the memory region corresponding to the data provided from the cache can be freed to be written-to using other data. If the data is stored in a memory pool node, at 1756, the network interface transmits one or more packets to the memory pool node to request the data. Subsequently, the data received from the memory pool node can be stored to memory or a processor cache for processing.

Figure 18A:
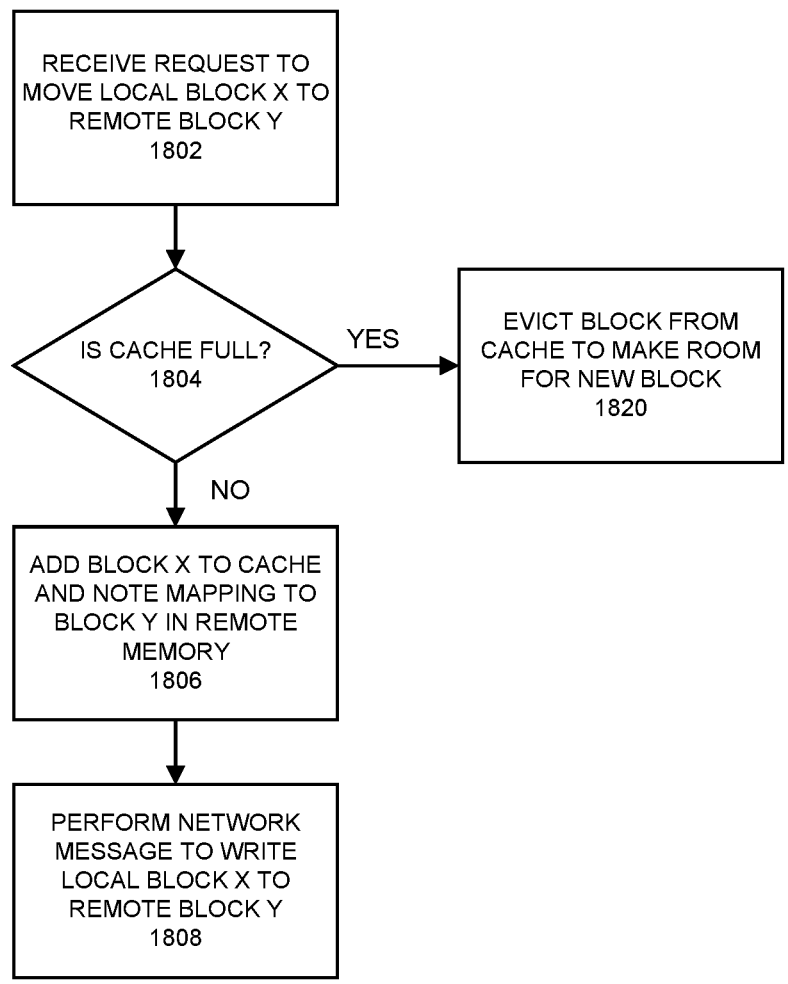
FIG. 18A depicts an example process.

FIG. 18A depicts an example process that can be performed by a network interface when data is copied from a local memory to remote memory. At 1802, a request is received to move local block X to a remote block Y in a memory pool node. Block X can correspond to a range of memory addresses in local memory whereas block Y can correspond to a range of memory addresses in a memory node pool.

At 1804, a determination can be made if a cache, utilized by a network interface to buffer data that is requested to be sent to a destination memory node, is full. If the cache is full, the process can proceed to 1820, and a block can evicted from the cache to make room for the block X and the block X is stored in the victim cache. Data to be evicted can be selected using a variety of techniques such as data that is in the cache for the longest time, a randomly-selected page or address, a page identified using ML as being least-likely to be referenced again in the near term, and so forth. At 1820, the evicted block be written to a memory pool node. In some examples, any amount of data can be evicted from the cache from a cache line to one or multiple pages.

At 1804, if the cache is not full, the process proceeds to 1806. At 1806, the block X is added to the victim cache by the network interface. The network interface can record that block X (e.g., source address) is stored in a local victim cache instead of a remote memory pool node. At 1808, in some cases, the block X can also be written to block Y in a memory pool node. Note that 1808 can be optional and data may be written to a remote memory pool node on eviction from the cache (e.g., "write back") or always written to remote memory pool node (e.g., "write through").

Figure 18B:
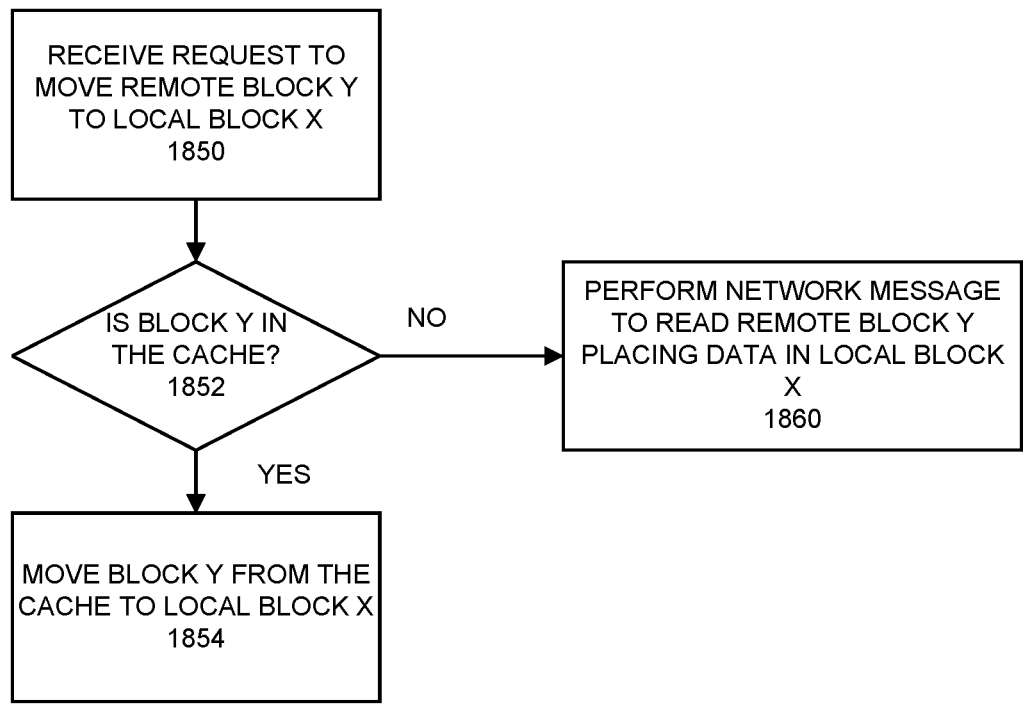
FIG. 18B depicts an example process.

FIG. 18B depicts an example process that can be performed by a network interface when data is read from a remote memory pool. At 1850, a request can be received to move remote block Y in a memory pool node to a local block X in a local memory. Block Y can correspond to a range of memory addresses in a memory node pool whereas block X can correspond to a range of memory addresses in local memory.

At 1852, the network interface can determine whether the block Y is stored in a local memory such as a victim cache or cache or memory managed by a network interface to store evicted content that is to be copied to a remote memory node. If the block Y is stored in a cache, the process can proceed to 1854, where the block Y is copied from the cache to local memory corresponding to a memory address range for block X. In some cases, the memory region corresponding to block Y can be freed to be written-to using other data.

Figure 19:
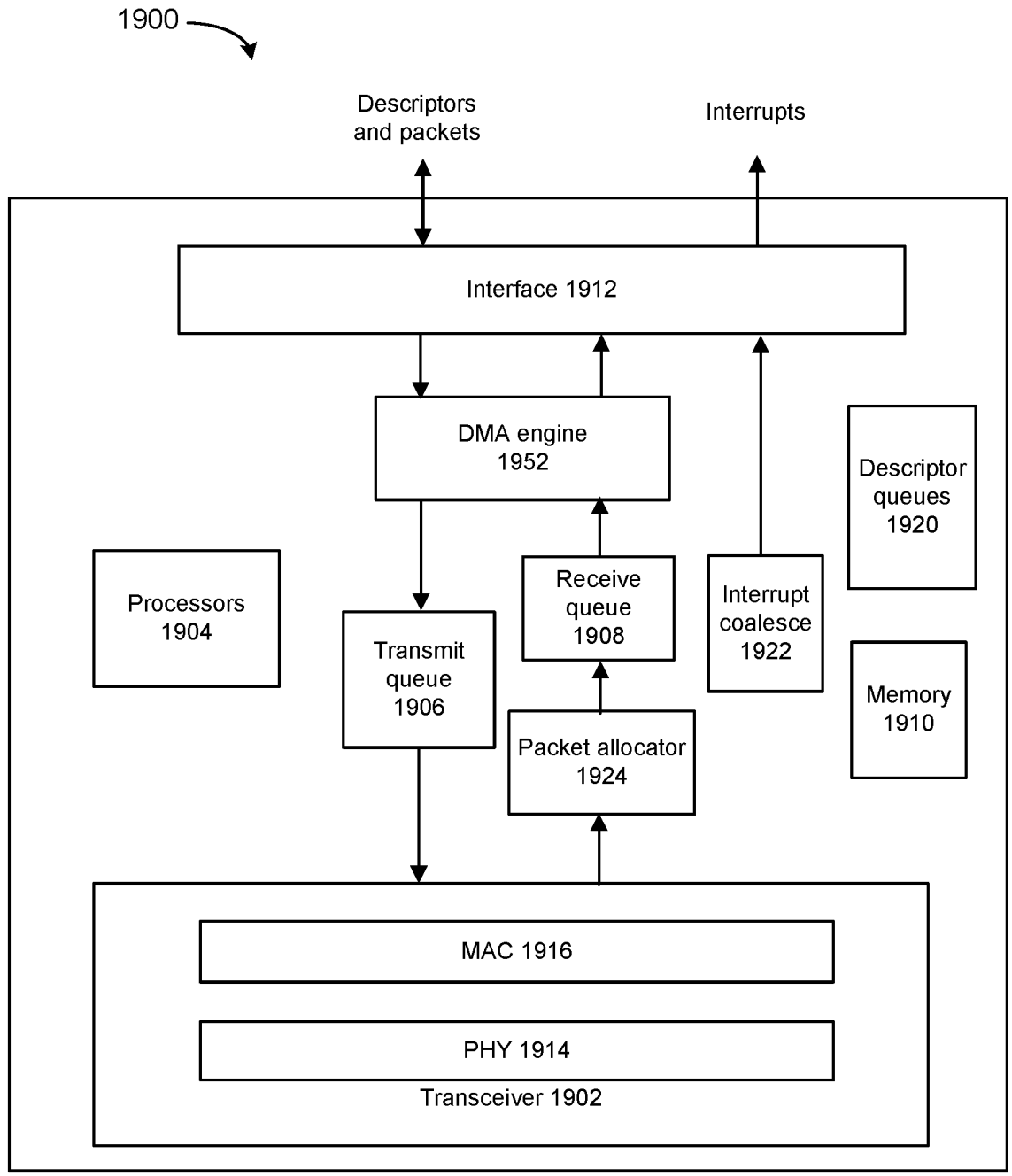
FIG. 19 depicts an example network interface.

FIG. 19 depicts a network interface that can use embodiments or be used by embodiments. In some embodiments, the network interface can include capability to cache content that is to be evicted to a remote memory node in accordance with embodiments described herein. In some examples, network interface 1900 can be implemented as a network interface controller, network interface card, switch, top of rack switch, switch for a rack of servers, a host fabric interface (HFI), or host bus adapter (HBA), and such examples can be interchangeable. Network interface 1900 can be coupled to one or more servers using a bus, PCIe, CXL, or DDR. Network interface 1900 may be embodied as part of a system-on-a-chip (SoC) that includes one or more processors, or included on a multichip package that also contains one or more processors.

Network interface 1900 can include transceiver 1902, processors 1904, transmit queue 1906, receive queue 1908, memory 1910, and bus interface 1912, and DMA engine 1952. Transceiver 1902 can be capable of receiving and transmitting packets in conformance with the applicable protocols such as Ethernet as described in IEEE 802.3, although other protocols may be used. Transceiver 1902 can receive and transmit packets from and to a network via a network medium (not depicted). Transceiver 1902 can include PHY circuitry 1914 and media access control (MAC) circuitry 1916. PHY circuitry 1914 can include encoding and decoding circuitry (not shown) to encode and decode data packets according to applicable physical layer specifications or standards. MAC circuitry 1916 can be configured to perform MAC address filtering on received packets, process MAC headers of received packets by verifying data integrity, remove preambles and padding, and provide packet content for processing by higher layers. MAC circuitry 1916 can be configured to assemble data to be transmitted into packets, that include destination and source addresses along with network control information and error detection hash values.

Processors 1904 can be any a combination of a: processor, core, graphics processing unit (GPU), field programmable gate array (FPGA), application specific integrated circuit (ASIC), or other programmable hardware device that allow programming of network interface 1900. For example, a "smart network interface" or SmartNIC can provide packet processing capabilities in the network interface using processors 1904. In some examples, processors 1904 can be implemented as a processor component for a SmartNIC.

Packet allocator 1924 can provide distribution of received packets for processing by multiple CPUs or cores using timeslot allocation described herein or RSS. When packet allocator 1924 uses RSS, packet allocator 1924 can calculate a hash or make another determination based on contents of a received packet to determine which CPU or core is to process a packet.

Interrupt coalesce 1922 can perform interrupt moderation whereby network interface interrupt coalesce 1922 waits for multiple packets to arrive, or for a time-out to expire, before generating an interrupt to host system to process received packet(s). Receive Segment Coalescing (RSC) can be performed by network interface 1900 whereby portions of incoming packets are combined into segments of a packet. Network interface 1900 provides this coalesced packet to an application.

Direct memory access (DMA) engine 1952 can copy a packet header, packet payload, and/or descriptor directly from host memory to the network interface or vice versa, instead of copying the packet to an intermediate buffer at the host and then using another copy operation from the intermediate buffer to the destination buffer. In some embodiments, multiple DMA engines are available for transfer of contents of packets to a destination memory associated with a host device or a destination memory associated with an accelerator device.

Memory 1910 can be any type of volatile or non-volatile memory device and can store any queue or instructions used to program network interface 1900. Transmit queue 1906 can include data or references to data for transmission by network interface. Receive queue 1908 can include data or references to data that was received by network interface from a network. Descriptor queues 1920 can include descriptors that reference data or packets in transmit queue 1906 or receive queue 1908 and corresponding destination memory regions. Bus interface 1912 can provide an interface with host device (not depicted). For example, bus interface 1912 can be compatible with PCI, PCI Express, PCI-x, Serial ATA, and/or USB compatible interface (although other interconnection standards may be used).

Figure 20:
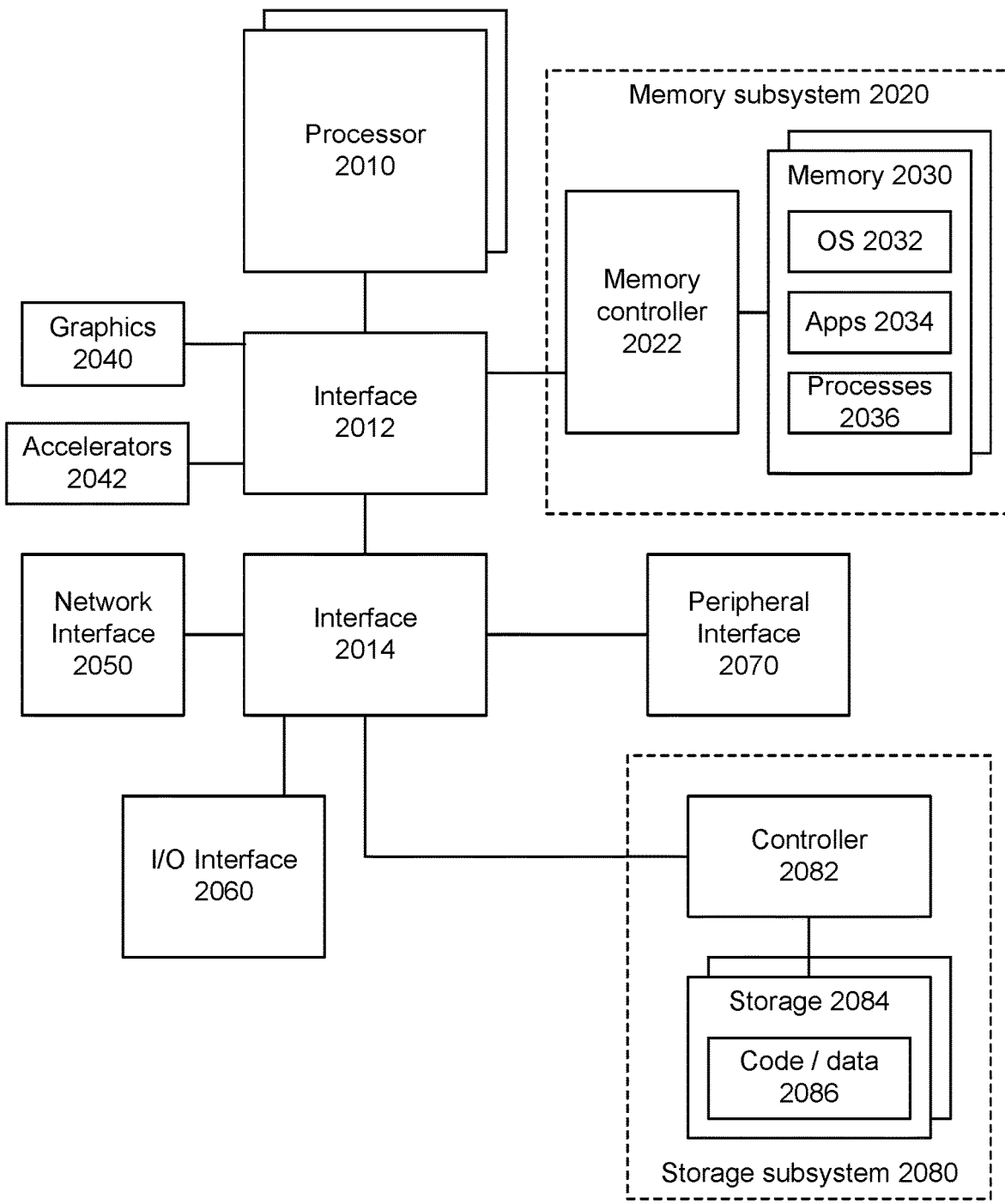
FIG. 20 depicts an example system.

FIG. 20 depicts a system. The system can use embodiments described herein where a network interface can include capability to cache content that is to be evicted to a remote memory node. System 2000 includes processor 2010, which provides processing, operation management, and execution of instructions for system 2000. Processor 2010 can include any type of microprocessor, central processing unit (CPU), graphics processing unit (GPU), processing core, or other processing hardware to provide processing for system 2000, or a combination of processors. Processor 2010 controls the overall operation of system 2000, and can be or include, one or more programmable general-purpose or special-purpose microprocessors, digital signal processors (DSPs), programmable controllers, application specific integrated circuits (ASICs), programmable logic devices (PLDs), or the like, or a combination of such devices.

In one example, system 2000 includes interface 2012 coupled to processor 2010, which can represent a higher speed interface or a high throughput interface for system components that needs higher bandwidth connections, such as memory subsystem 2020, graphics interface components 2040, or accelerators 2042. Interface 2012 represents an interface circuit, which can be a standalone component or integrated onto a processor die. Where present, graphics interface 2040 interfaces to graphics components for providing a visual display to a user of system 2000. In one example, graphics interface 2040 can drive a high definition (HD) display that provides an output to a user. High definition can refer to a display having a pixel density of approximately 100 PPI (pixels per inch) or greater and can include formats such as full HD (e.g., 1080p), retina displays, 4K (ultra-high definition or UHD), or others. In one example, the display can include a touchscreen display. In one example, graphics interface 2040 generates a display based on data stored in memory 2030 or based on operations executed by processor 2010 or both. In one example, graphics interface 2040 generates a display based on data stored in memory 2030 or based on operations executed by processor 2010 or both.

Accelerators 2042 can be a programmable or fixed function offload engine that can be accessed or used by a processor 2010. For example, an accelerator among accelerators 2042 can provide compression (DC) capability, cryptography services such as public key encryption (PKE), cipher, hash/authentication capabilities, decryption, or other capabilities or services. In some embodiments, in addition or alternatively, an accelerator among accelerators 2042 provides field select controller capabilities as described herein. In some cases, accelerators 2042 can be integrated into a CPU socket (e.g., a connector to a motherboard or circuit board that includes a CPU and provides an electrical interface with the CPU). For example, accelerators 2042 can include a single or multi-core processor, graphics processing unit, logical execution unit single or multi-level cache, functional units usable to independently execute programs or threads, application specific integrated circuits (ASICs), neural network processors (NNPs), programmable control logic, and programmable processing elements such as field programmable gate arrays (FPGAs). Accelerators 2042 can provide multiple neural networks, processor cores, or graphics processing units can be made available for use by artificial intelligence (AI) or machine learning (ML) models. For example, the AI model can use or include any or a combination of: a reinforcement learning scheme, Q-learning scheme, deep-Q learning, or Asynchronous Advantage Actor-Critic (A3C), combinatorial neural network, recurrent combinatorial neural network, or other AI or ML model. Multiple neural networks, processor cores, or graphics processing units can be made available for use by AI or ML models.

Memory subsystem 2020 represents the main memory of system 2000 and provides storage for code to be executed by processor 2010, or data values to be used in executing a routine. Memory subsystem 2020 can include one or more memory devices 2030 such as read-only memory (ROM), flash memory, one or more varieties of random access memory (RAM) such as DRAM, or other memory devices, or a combination of such devices. Memory 2030 stores and hosts, among other things, operating system (OS) 2032 to provide a software platform for execution of instructions in system 2000. Additionally, applications 2034 can execute on the software platform of OS 2032 from memory 2030. Applications 2034 represent programs that have their own operational logic to perform execution of one or more functions. Processes 2036 represent agents or routines that provide auxiliary functions to OS 2032 or one or more applications 2034 or a combination. OS 2032, applications 2034, and processes 2036 provide software logic to provide functions for system 2000. In one example, memory subsystem 2020 includes memory controller 2022, which is a memory controller to generate and issue commands to memory 2030. It will be understood that memory controller 2022 could be a physical part of processor 2010 or a physical part of interface 2012. For example, memory controller 2022 can be an integrated memory controller, integrated onto a circuit with processor 2010.

In some examples, OS 2032 can determine a capability of a device associated with a device driver. For example, OS 2032 can receive an indication of a capability of a device (e.g., NIC 2050 or a storage configuration interface) to configure a NIC 2050 selectively cache evicted content or manage content of a local cache as described herein. OS 2032 can request a driver to enable or disable NIC 2050 to perform any of the capabilities described herein. In some examples, OS 2032, itself, can enable or disable NIC 2050 to perform any of the capabilities described herein. OS 2032 can provide requests (e.g., from an application or VM) to NIC 2050 to utilize one or more capabilities of NIC 2050. For example, any application can request use or non-use of any of capabilities described herein by NIC 2050.

While not specifically illustrated, it will be understood that system 2000 can include one or more buses or bus systems between devices, such as a memory bus, a graphics bus, interface buses, or others. Buses or other signal lines can communicatively or electrically couple components together, or both communicatively and electrically couple the components. Buses can include physical communication lines, point-to-point connections, bridges, adapters, controllers, or other circuitry or a combination. Buses can include, for example, one or more of a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus.

In one example, system 2000 includes interface 2014, which can be coupled to interface 2012. In one example, interface 2014 represents an interface circuit, which can include standalone components and integrated circuitry. In one example, multiple user interface components or peripheral components, or both, couple to interface 2014. Network interface 2050 provides system 2000 the ability to communicate with remote devices (e.g., servers or other computing devices) over one or more networks. Network interface 2050 can include an Ethernet adapter, wireless interconnection components, cellular network interconnection components, USB (universal serial bus), or other wired or wireless standards-based or proprietary interfaces. Network interface 2050 can transmit data to a remote device, which can include sending data stored in memory. Network interface 2050 can receive data from a remote device, which can include storing received data into memory. Various embodiments can be used in connection with network interface 2050, processor 2010, and memory subsystem 2020.

In one example, system 2000 includes one or more input/output (I/O) interface(s) 2060. I/O interface 2060 can include one or more interface components through which a user interacts with system 2000 (e.g., audio, alphanumeric, tactile/touch, or other interfacing). Peripheral interface 2070 can include any hardware interface not specifically mentioned above. Peripherals refer generally to devices that connect dependently to system 2000. A dependent connection is one where system 2000 provides the software platform or hardware platform or both on which operation executes, and with which a user interacts.

In one example, system 2000 includes storage subsystem 2080 to store data in a nonvolatile manner. In one example, in certain system implementations, at least certain components of storage 2080 can overlap with components of memory subsystem 2020. Storage subsystem 2080 includes storage device(s) 2084, which can be or include any conventional medium for storing large amounts of data in a nonvolatile manner, such as one or more magnetic, solid state, or optical based disks, or a combination. Storage 2084 holds code or instructions and data 2086 in a persistent state (e.g., the value is retained despite interruption of power to system 2000). Storage 2084 can be generically considered to be a "memory," although memory 2030 is typically the executing or operating memory to provide instructions to processor 2010. Whereas storage 2084 is nonvolatile, memory 2030 can include volatile memory (e.g., the value or state of the data is indeterminate if power is interrupted to system 2000). In one example, storage subsystem 2080 includes controller 2082 to interface with storage 2084. In one example controller 2082 is a physical part of interface 2014 or processor 2010 or can include circuits or logic in both processor 2010 and interface 2014.

A volatile memory is memory whose state (and therefore the data stored in it) is indeterminate if power is interrupted to the device. Dynamic volatile memory requires refreshing the data stored in the device to maintain state. One example of dynamic volatile memory incudes DRAM (Dynamic Random Access Memory), or some variant such as Synchronous DRAM (SDRAM). Another example of volatile memory includes cache or static random access memory (SRAM). A memory subsystem as described herein may be compatible with a number of memory technologies, such as DDR3 (Double Data Rate version 3, original release by JEDEC (Joint Electronic Device Engineering Council) on Jun. 27, 2007). DDR4 (DDR version 4, initial specification published in September 2012 by JEDEC), DDR4E (DDR version 4), LPDDR3 (Low Power DDR version3, JESD209-3B, August 2013 by JEDEC), LPDDR4) LPDDR version 4, JESD209-4, originally published by JEDEC in August 2014), WIO2 (Wide Input/output version 2, JESD229-2 originally published by JEDEC in August 2014, HBM (High Bandwidth Memory, JESD325, originally published by JEDEC in October 2013, LPDDR5 (currently in discussion by JEDEC), HBM2 (HBM version 2), currently in discussion by JEDEC, or others or combinations of memory technologies, and technologies based on derivatives or extensions of such specifications. The JEDEC standards are available at www.jedec.org.

A non-volatile memory (NVM) device is a memory whose state is determinate even if power is interrupted to the device. In one embodiment, the NVM device can comprise a block addressable memory device, such as NAND technologies, or more specifically, multi-threshold level NAND flash memory (for example, Single-Level Cell ("SLC"), Multi-Level Cell ("MLC"), Quad-Level Cell ("QLC"), Tri-Level Cell ("TLC"), or some other NAND). A NVM device can also comprise a byte-addressable write-in-place three dimensional cross point memory device, or other byte addressable write-in-place NVM device (also referred to as persistent memory), such as single or multi-level Phase Change Memory (PCM) or phase change memory with a switch (PCMS), Intel® Optane™ memory, NVM devices that use chalcogenide phase change material (for example, chalcogenide glass), resistive memory including metal oxide base, oxygen vacancy base and Conductive Bridge Random Access Memory (CB-RAM), nanowire memory, ferroelectric random access memory (FeRAM, FRAM), magneto resistive random access memory (MRAM) that incorporates memristor technology, spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory.

A power source (not depicted) provides power to the components of system 2000. More specifically, power source typically interfaces to one or multiple power supplies in system 2000 to provide power to the components of system 2000. In one example, the power supply includes an AC to DC (alternating current to direct current) adapter to plug into a wall outlet. Such AC power can be renewable energy (e.g., solar power) power source. In one example, power source includes a DC power source, such as an external AC to DC converter. In one example, power source or power supply includes wireless charging hardware to charge via proximity to a charging field. In one example, power source can include an internal battery, alternating current supply, motion-based power supply, solar power supply, or fuel cell source.

In an example, system 2000 can be implemented using interconnected compute sleds of processors, memories, storages, network interfaces, and other components. High speed connections can be used such as: Ethernet (IEEE 802.3), remote direct memory access (RDMA), InfiniBand, Internet Wide Area RDMA Protocol (iWARP), Transmission Control Protocol (TCP), User Datagram Protocol (UDP), quick UDP Internet Connections (QUIC), RDMA over Converged Ethernet (RoCE), Peripheral Component Interconnect express (PCIe), Intel® QuickPath Interconnect (QPI), Intel® Ultra Path Interconnect (UPI), Intel® On-Chip System Fabric (IOSF), Omnipath, Compute Express Link (CXL), Hyper-Transport, high-speed fabric, NVLink, Advanced Microcontroller Bus Architecture (AMBA) interconnect, OpenCAPI, Gen-Z, Cache Coherent Interconnect for Accelerators (CCIX), 3GPP Long Term Evolution (LTE) (4G), 3GPP 5G, DisplayPort, embedded DisplayPort, MIPI, HDMI, Infinity Fabric (IF), and successors or variations thereof.

Embodiments herein may be implemented in various types of computing and networking equipment, such as switches, routers, racks, and blade servers such as those employed in a data center and/or server farm environment. The servers used in data centers and server farms comprise arrayed server configurations such as rack-based servers or blade servers. These servers are interconnected in communication via various network provisions, such as partitioning sets of servers into Local Area Networks (LANs) with appropriate switching and routing facilities between the LANs to form a private Intranet. For example, cloud hosting facilities may typically employ large data centers with a multitude of servers. A blade comprises a separate computing platform that is configured to perform server-type functions, that is, a "server on a card." Accordingly, each blade includes components common to conventional servers, including a main printed circuit board (main board) providing internal wiring (e.g., buses) for coupling appropriate integrated circuits (ICs) and other components mounted to the board.

In some examples, network interface and other embodiments described herein can be used in connection with a base station (e.g., 3G, 4G, 5G and so forth), macro base station (e.g., 5G networks), picostation (e.g., an IEEE 802.11 compatible access point), nanostation (e.g., for Point-to-MultiPoint (PtMP) applications), on-premises data centers, off-premises data centers, edge network elements, fog network elements, and/or hybrid data centers (e.g., data center that use virtualization, cloud and software-defined networking to deliver application workloads across physical data centers and distributed multi-cloud environments).

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASICs, PLDs, DSPs, FPGAs, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, APIs, instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation. A processor can be one or more combination of a hardware state machine, digital control logic, central processing unit, or any hardware, firmware and/or software elements.

Some examples may be implemented using or as an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that actually make the logic or processor.

The appearances of the phrase "one example" or "an example" are not necessarily all referring to the same example or embodiment. Any aspect described herein can be combined with any other aspect or similar aspect described herein, regardless of whether the aspects are described with respect to the same figure or element. Division, omission or inclusion of block functions depicted in the accompanying figures does not infer that the hardware components, circuits, software and/or elements for implementing these functions would necessarily be divided, omitted, or included in embodiments.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

The terms "first," "second," and the like, herein do not denote any order, quantity, or importance, but rather are used to distinguish one element from another. The terms "a" and "an" herein do not denote a limitation of quantity, but rather denote the presence of at least one of the referenced items. The term "asserted" used herein with reference to a signal denote a state of the signal, in which the signal is active, and which can be achieved by applying any logic level either logic 0 or logic 1 to the signal. The terms "follow" or "after" can refer to immediately following or following after some other event or events. Other sequences of operations may also be performed according to alternative embodiments. Furthermore, additional operations may be added or removed depending on the particular applications. Any combination of changes can be used and one of ordinary skill in the art with the benefit of this disclosure would understand the many variations, modifications, and alternative embodiments thereof.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z.'"

Example 1 includes a method comprising: at a network interface: receiving a request to copy data evicted from a local memory for storage in a remote memory and storing the evicted data into a memory device connected to the network interface.

Example 2 includes any example and includes at the network interface: recording that the evicted data is stored in the memory device connected to the network interface.

Example 3 includes any example, wherein the remote memory comprises a memory node pool.

Example 4 includes any example, wherein storing the evicted data into a memory device connected to the network interface is based at least in part on the evicted data determined to be accessed again by a local node.

Example 5 includes any example, wherein the request comprises a direct memory access (DMA) request comprising a source address, a destination address, and a length.

Example 6 includes any example, and includes if the source address corresponds to a local memory device and the destination address corresponds to a remote memory device: transmitting, using the network interface, at least one packet for transmission of the data to the remote memory.

Example 7 includes any example, and includes pre-fetching content into the memory device connected to the network interface based on a prediction the content is to be accessed by a local node.

Example 8 includes any example, and includes at the network interface: receiving a request to access the data from the remote memory and providing the data from the memory device connected to the network interface to a requester of the data based on the data being stored in the memory device connected to the network interface.

Example 9 includes any example, and includes at the network interface: sending one or more packets to store the data into the remote memory in addition to the memory device connected to the network interface.

Example 10 includes any example, and includes a computer-readable medium comprising instructions stored thereon, that if executed by one or more processors, cause the one or more processors to: configure a network interface to manage a cache by: storing data evicted from a memory into the cache based at least in part on the data being accessed again by a local node and recording that the evicted data is stored in the cache.

Example 11 includes any example, wherein: storing data evicted from a memory into the cache based at least in part on the data being accessed again by a local node comprises storing most recently evicted data from the memory into the cache.

Example 12 includes any example, and includes instructions stored thereon, that if executed by one or more processors, cause the one or more processors to: configure the network interface to manage the cache by: storing data evicted from the memory that is not stored into the cache to a remote memory device.

Example 13 includes any example, and includes an apparatus comprising: a network interface configured to: receive a request to copy data from a local memory to a remote memory; based on a configuration that the network interface is to manage a cache: store the data into the cache and record that the data is stored in the cache.

Example 14 includes any example, wherein to store the data in the cache comprises store most recently evicted data from the local memory into the cache.

Example 15 includes any example, wherein the network interface is to: store data evicted from the local memory that is not stored into the cache into one or more remote memories.

Example 16 includes any example, wherein the request comprises a direct memory access (DMA) request comprising a source address, a destination address, and a length.

Example 17 includes any example, wherein the network interface is configured to: if the source address corresponds to a local memory device and the destination address corresponds to a remote memory device: generate at least one packet for transmission of the data to the remote memory.

Example 18 includes any example, wherein the network interface is configured to: pre-fetch data into the cache based on a prediction the data is to be accessed by a local host node to the network interface.

Example 19 includes any example, wherein the network interface is configured to: receive a request to access the data from the remote memory and provide the data from the cache to a requester of the data based on the data being stored in the cache.

Example 20 includes any example, comprising one or more of a server, rack, or data center, wherein the server, rack, or data center includes cache or memory that has content evicted is evicted to the cache.

What is claimed is:
1. A method comprising:
   at a network interface device comprising: a network interface, a direct memory access (DMA) circuitry, and a host interface:
   in response to receipt of a request to copy data evicted from a first memory for storage in a remote second memory:
      automatically storing the evicted data from the first memory into a third memory connected to the network interface device;
      responding to a second request for the evicted data by providing the evicted data from the third memory, wherein
      the network interface device accesses the second memory by one or more Ethernet packets.
2. The method of claim 1, comprising:
   at the network interface device:
      recording that the evicted data is stored in the third memory connected to the network interface device.
3. The method of claim 1, wherein the second memory comprises a memory node pool.
4. The method of claim 1, wherein the automatically storing the evicted data into the third memory connected to the network interface device is also based at least in part on the evicted data determined to be accessed multiple times within a time window based on at least one prior pattern of accesses of the evicted data.
5. The method of claim 1, wherein the request comprises a direct memory access (DMA) request comprising a source address, a destination address, and a length.

6. The method of claim 5, comprising:
if the source address corresponds to the first memory and the destination address corresponds to the second memory: transmitting, using the network interface device, at least one Ethernet packet for transmission of the evicted data to the second memory.

7. The method of claim 1, comprising:
pre-fetching content into the third memory connected to the network interface device based on a prediction the evicted data is to be accessed by a processor coupled to the network interface device.

8. The method of claim 1, comprising:
at the network interface device:
receiving a second request to access the evicted data from the second memory and
providing the evicted data from the third memory connected to the network interface device to a requester of the evicted data based on the evicted data being stored in the third memory connected to the network interface device.

9. The method of claim 1, comprising:
at the network interface device:
sending one or more Ethernet packets to store the evicted data into the second memory in addition to the third memory connected to the network interface device.

10. The method of claim 1, wherein the automatically storing the evicted data into the third memory connected to the network interface device is also based at least in part on an indication from a processor-executed operating system (OS) that the evicted data is to be accessed again within an amount of time.

11. At least one non-transitory computer-readable medium comprising instructions stored thereon, that if executed by one or more processors, cause the one or more processors to:
configure a network interface device comprising: a network interface, a direct memory access (DMA) circuitry, and a host interface, to manage a victim cache by:
based on eviction of data from a memory:
storing the data evicted from the memory into the victim cache; and
recording that the evicted data is stored in the victim cache.

12. The computer-readable medium of claim 11, wherein:
storing data evicted from the memory into the victim cache based at least in part on the data being accessed again by a processor comprises storing most recently evicted data from the memory into the victim cache.

13. The computer-readable medium of claim 11, comprising instructions stored thereon, that if executed by one or more processors, cause the one or more processors to:
configure the network interface device to manage the victim cache by:
storing data evicted from the memory that is not stored into the victim cache to a remote memory device accessible by one or more Ethernet packets.

14. An apparatus comprising:
a network interface device comprising: a network interface, a direct memory access (DMA) circuitry, and a host interface, wherein the network interface device is configured to:
based on a configuration that the network interface device is to manage a cache:
in response to receipt of a request to copy data evicted from a first memory to a second memory:
automatically store the evicted data into the cache;
record that the evicted data is stored in the cache; and
respond to a second request for the evicted data by providing the evicted data from the cache.

15. The apparatus of claim 14, wherein to automatically store the evicted data in the cache comprises store most recently evicted data from a first memory into the cache.

16. The apparatus of claim 14, wherein the network interface device is to:
store data evicted from the first memory that is not stored into the cache into one or more remote memories.

17. The apparatus of claim 14, wherein the request comprises a direct memory access (DMA) request comprising a source address, a destination address, and a length.

18. The apparatus of claim 17, wherein the network interface device is configured to:
if the source address corresponds to the first memory and the destination address corresponds to the second memory: generate at least one Ethernet packet for transmission of the evicted data to the second memory.

19. The apparatus of claim 14, wherein the network interface device is configured to:
pre-fetch data into the cache based on a prediction the data is to be accessed by a local host node to the network interface device based on a prior access pattern concerning the data.

20. The apparatus of claim 14, wherein the network interface device is configured to:
receive a second request to access the data from the second memory and
provide the data from the cache to a requester of the data based on the data being stored in the cache.

21. The apparatus of claim 14, comprising one or more of a server, rack, or data center, wherein the server, rack, or data center includes the first memory.

* * * * *

UNITED STATES PATENT AND TRADEMARK OFFICE
CERTIFICATE OF CORRECTION

PATENT NO. : 12,132,581 B2
APPLICATION NO. : 17/103802
DATED : October 29, 2024
INVENTOR(S) : Sujoy Sen et al.

It is certified that error appears in the above-identified patent and that said Letters Patent is hereby corrected as shown below:

In the Claims

Column 34, Line 38, Claim 1, should read as follows:
A method comprising:
    at a network interface device comprising: a network interface, a direct memory access (DMA) circuitry, and a host interface:
        in response to receipt of a request to copy data evicted from a first memory for storage in a second memory:
            automatically storing the evicted data from the first memory into a third memory connected to the network interface device;
            responding to a second request for the evicted data by providing the evicted data from the third memory, wherein
                the network interface device accesses the second memory by one or more Ethernet packets.

Signed and Sealed this
Twenty-sixth Day of November, 2024

Katherine Kelly Vidal
*Director of the United States Patent and Trademark Office*